(12) United States Patent
Atterbury et al.

(10) Patent No.: US 9,753,751 B2
(45) Date of Patent: *Sep. 5, 2017

(54) DYNAMICALLY LOADING GRAPH-BASED COMPUTATIONS

(71) Applicant: Ab Initio Technology LLC, Lexington, MA (US)

(72) Inventors: Matthew Darcy Atterbury, Lexington, MA (US); H. Mark Bromley, Lyndeborough, NH (US); Wayne Mesard, Belmont, MA (US); Arkadi Popov, Sharon, MA (US); Stephen Schmidt, Medford, MA (US); Craig W. Stanfill, Lincoln, MA (US); Joseph Skeffington Wholey, Belmont (MA)

(73) Assignee: Ab Initio Technology LLC, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/520,588

(22) Filed: Oct. 22, 2014

(65) Prior Publication Data

US 2015/0106818 A1     Apr. 16, 2015

Related U.S. Application Data

(63) Continuation of application No. 13/161,010, filed on Jun. 15, 2011, now Pat. No. 8,875,145.

(Continued)

(51) Int. Cl.
    *G06F 9/46*    (2006.01)
    *G06F 9/445*   (2006.01)
    *G06F 9/44*    (2006.01)

(52) U.S. Cl.
    CPC ........ *G06F 9/44521* (2013.01); *G06F 9/4436* (2013.01); *G06F 9/44536* (2013.01)

(58) Field of Classification Search
    CPC .. G06F 9/4843; G06F 9/44521; G06F 9/4436; G06F 9/44536
    (Continued)

(56) References Cited

U.S. PATENT DOCUMENTS 3,662,343 A   5/1972  Goldstein et al.
3,662,401 A   5/1972  Collins et al.
(Continued)

FOREIGN PATENT DOCUMENTS

AU   2014/262225   12/2014
CN      1965296     5/2007
(Continued)

OTHER PUBLICATIONS

Babaoglu, O et al., "Mapping parallel computations onto distributed systems in Paralex" Compuero '91. Advanced Computer Technology, Reliable Systems and Applications. 5th Annual European Computer Conference. Proceedings. Bologna, Italy May 13-16, 1991, Los Alamitos, CA, USA, IEEE Comput. Soc, US, May 13, 1991, pp. 123-130.

(Continued)

*Primary Examiner* — Camquy Truong
(74) *Attorney, Agent, or Firm* — Fish & Richardson P.C.

(57) ABSTRACT

Processing data includes: receiving units of work that each include one or more work elements, and processing a first unit of work using a first compiled dataflow graph (160) loaded into a data processing system (100) in response to receiving the first unit of work. The processing includes: analysis to determine a characteristic of the first unit of work; identifying one or more compiled dataflow graphs from graphs stored in a data storage system (107) that include at least some that were compiled for processing a unit of work having the determined characteristic; loading one of the identified compiled dataflow graphs into the data (Continued)

processing system (100) as the first compiled dataflow graph (160); and generating one or more output work elements from at least one work element in the first unit of work.

69 Claims, 9 Drawing Sheets

Related U.S. Application Data

(60) Provisional application No. 61/355,129, filed on Jun. 15, 2010.

(58) Field of Classification Search
USPC .......................................................... 718/102
See application file for complete search history.

(56) References Cited

U.S. PATENT DOCUMENTS

| | | | |
|---|---|---|---|
| 4,228,496 A | | 10/1980 | Katzman et al. |
| 4,922,418 A | | 5/1990 | Dolecek |
| 4,972,314 A | | 11/1990 | Getzinger et al. |
| 5,050,068 A | * | 9/1991 | Dollas ................... G06F 8/445 |
| | | | 712/206 |
| 5,127,104 A | | 6/1992 | Dennis |
| 5,276,899 A | | 1/1994 | Neches |
| 5,280,619 A | | 1/1994 | Wang |
| 5,301,336 A | | 4/1994 | Kodosky |
| 5,323,452 A | | 6/1994 | Dickman et al. |
| 5,333,319 A | | 7/1994 | Silen |
| 5,357,632 A | | 10/1994 | Pian et al. |
| 5,495,590 A | | 2/1996 | Comfort et al. |
| 5,504,900 A | | 4/1996 | Raz |
| 5,630,047 A | | 5/1997 | Wang |
| 5,692,168 A | | 11/1997 | McMahan |
| 5,701,400 A | | 12/1997 | Amado |
| 5,712,971 A | | 1/1998 | Stanfill et al. |
| 5,745,778 A | | 4/1998 | Alfieri |
| 5,799,266 A | | 8/1998 | Hayes |
| 5,802,267 A | | 9/1998 | Shirakihara et al. |
| 5,805,462 A | | 9/1998 | Poirot et al. |
| 5,857,204 A | | 1/1999 | Lordi et al. |
| 5,923,832 A | | 7/1999 | Shirakihara et al. |
| 5,924,095 A | | 7/1999 | White |
| 5,930,794 A | | 7/1999 | Linenbach et al. |
| 5,933,640 A | | 8/1999 | Dion |
| 5,950,212 A | | 9/1999 | Anderson et al. |
| 5,966,072 A | | 10/1999 | Stanfill et al. |
| 5,999,729 A | | 12/1999 | Tabloski, Jr. et al. |
| 6,006,242 A | | 12/1999 | Poole et al. |
| 6,012,094 A | | 1/2000 | Leyman |
| 6,014,670 A | | 1/2000 | Zamanian et al. |
| 6,016,516 A | | 1/2000 | Horikiri |
| 6,032,158 A | | 2/2000 | Mukhopadhhyay et al. |
| 6,038,558 A | | 3/2000 | Powers et al. |
| 6,044,211 A | | 3/2000 | Jain |
| 6,044,374 A | | 3/2000 | Nesamoney et al. |
| 6,044,394 A | | 3/2000 | Cadden et al. |
| 6,088,716 A | | 7/2000 | Stanfill et al. |
| 6,145,017 A | | 11/2000 | Ghaffari |
| 6,173,276 B1 | | 1/2001 | Kant et al. |
| 6,208,345 B1 | | 3/2001 | Sheard et al. |
| 6,256,637 B1 | | 7/2001 | Venkatesh et al. |
| 6,259,988 B1 | | 7/2001 | Galkowski et al. |
| 6,272,650 B1 | | 8/2001 | Meyer et al. |
| 6,301,601 B1 | | 10/2001 | Helland |
| 6,314,114 B1 | | 11/2001 | Coyle et al. |
| 6,324,437 B1 | | 11/2001 | Frankel et al. |
| 6,330,008 B1 | | 12/2001 | Razdow et al. |
| 6,332,212 B1 | | 12/2001 | Organ et al. |
| 6,339,775 B1 | | 1/2002 | Zamanian et al. |
| 6,400,996 B1 | | 6/2002 | Hoffberg et al. |
| 6,401,216 B1 | | 6/2002 | Meth et al. |
| 6,437,796 B2 | | 8/2002 | Sowizral et al. |
| 6,449,711 B1 | | 9/2002 | Week |
| 6,480,876 B2 | | 11/2002 | Rehg et al. |
| 6,496,961 B2 | | 12/2002 | Gupta et al. |
| 6,538,651 B1 | | 3/2003 | Hayman et al. |
| 6,584,581 B1 | | 6/2003 | Bay et al. |
| 6,608,628 B1 | | 8/2003 | Ross et al. |
| 6,611,862 B2 | | 8/2003 | Reisman |
| 6,651,234 B2 | | 11/2003 | Gupta et al. |
| 6,654,907 B2 | | 11/2003 | Stanfill et al. |
| 6,658,464 B2 | | 12/2003 | Reisman |
| 6,715,145 B1 | | 3/2004 | Bowman-Amuah |
| 6,728,879 B1 | | 4/2004 | Atkinson |
| 6,760,903 B1 | | 7/2004 | Morshed et al. |
| 6,813,761 B1 | | 11/2004 | Das et al. |
| 6,816,825 B1 | | 11/2004 | Ashar et al. |
| 6,832,369 B1 | | 12/2004 | Kryka et al. |
| 6,848,100 B1 | | 1/2005 | Wu et al. |
| 6,879,946 B2 | | 4/2005 | Rong et al. |
| 6,975,628 B2 | * | 12/2005 | Johnson ................... G06F 8/24 |
| | | | 370/389 |
| 7,062,483 B2 | | 6/2006 | Ferrari et al. |
| 7,082,604 B2 | | 7/2006 | Schneiderman |
| 7,085,426 B2 | | 8/2006 | August |
| 7,103,597 B2 | | 9/2006 | McGovern |
| 7,103,620 B2 | | 9/2006 | Kunz et al. |
| 7,130,484 B2 | | 10/2006 | August |
| 7,137,116 B2 | | 11/2006 | Parkes et al. |
| 7,164,422 B1 | | 1/2007 | Wholey et al. |
| 7,165,030 B2 | | 1/2007 | Yi et al. |
| 7,167,850 B2 | | 1/2007 | Stanfill |
| 7,316,001 B2 | | 1/2008 | Gold et al. |
| 7,356,819 B1 | | 4/2008 | Ricart et al. |
| 7,398,514 B2 | | 7/2008 | Ulrich et al. |
| 7,412,658 B2 | | 8/2008 | Gilboa |
| 7,417,645 B2 | | 8/2008 | Beda et al. |
| 7,457,984 B2 | | 11/2008 | Kutan |
| 7,467,383 B2 | | 12/2008 | Inchingolo et al. |
| 7,505,975 B2 | | 3/2009 | Luo |
| 7,577,628 B2 | | 8/2009 | Stanfill |
| 7,594,220 B2 | | 9/2009 | Kodosky et al. |
| 7,636,699 B2 | | 12/2009 | Stanfill |
| 7,716,630 B2 | | 5/2010 | Wholey et al. |
| 7,756,940 B2 | | 7/2010 | Sagawa |
| 7,840,949 B2 | | 11/2010 | Schumacher et al. |
| 7,870,556 B2 | | 1/2011 | Wholey et al. |
| 7,877,350 B2 | | 1/2011 | Stanfill et al. |
| 7,979,479 B2 | | 7/2011 | Staebler et al. |
| 8,281,297 B2 | * | 10/2012 | Dasu ....................... G06F 8/433 |
| | | | 717/161 |
| 8,286,176 B1 | | 10/2012 | Baumback et al. |
| 8,396,886 B1 | | 3/2013 | Tsimelzon et al. |
| 8,566,641 B2 | | 10/2013 | Douros et al. |
| 9,274,926 B2 | | 3/2016 | Larson et al. |
| 2001/0055019 A1 | | 12/2001 | Sowizral et al. |
| 2002/0080181 A1 | | 6/2002 | Razdow et al. |
| 2002/0087921 A1 | | 7/2002 | Rodriguez |
| 2002/0091747 A1 | | 7/2002 | Rehg et al. |
| 2002/0091748 A1 | | 7/2002 | Rehg et al. |
| 2002/0107743 A1 | | 8/2002 | Sagawa |
| 2002/0111876 A1 | | 8/2002 | Rudraraju et al. |
| 2002/0129340 A1 | | 9/2002 | Tuttle |
| 2002/0147745 A1 | | 10/2002 | Houben et al. |
| 2002/0184616 A1 | | 12/2002 | Chessell et al. |
| 2003/0004771 A1 | | 1/2003 | Yaung |
| 2003/0023413 A1 | | 1/2003 | Srinivasa |
| 2003/0033432 A1 | | 2/2003 | Simpson et al. |
| 2003/0091055 A1 | | 5/2003 | Craddock et al. |
| 2003/0126240 A1 | | 7/2003 | Vosseler |
| 2003/0204804 A1 | | 10/2003 | Petri et al. |
| 2004/0006745 A1 | | 1/2004 | Van Heldan et al. |
| 2004/0041838 A1 | | 3/2004 | Adusumilli et al. |
| 2004/0073529 A1 | | 4/2004 | Stanfill |
| 2004/0093559 A1 | | 5/2004 | Amaru et al. |
| 2004/0098452 A1 | | 5/2004 | Brown et al. |
| 2004/0107414 A1 | | 6/2004 | Bronicki et al. |
| 2004/0111469 A1 | | 6/2004 | Manion et al. |
| 2004/0148373 A1 | | 7/2004 | Childress et al. |
| 2004/0177099 A1 | | 9/2004 | Ganesh et al. |
| 2004/0205726 A1 | | 10/2004 | Chedgey et al. |
| 2004/0207665 A1 | | 10/2004 | Mathur |

(56) References Cited

U.S. PATENT DOCUMENTS

| | | |
|---|---|---|
| 2004/0210831 A1 | 10/2004 | Feng et al. |
| 2004/0225657 A1 | 11/2004 | Sarkar |
| 2004/0260590 A1 | 12/2004 | Golani et al. |
| 2005/0021689 A1 | 1/2005 | Marvin et al. |
| 2005/0033720 A1 | 2/2005 | Verma et al. |
| 2005/0034112 A1 | 2/2005 | Stanfill |
| 2005/0039176 A1 | 2/2005 | Fournie |
| 2005/0059046 A1 | 3/2005 | Labrenz et al. |
| 2005/0086360 A1 | 4/2005 | Mamou et al. |
| 2005/0097515 A1 | 5/2005 | Ribling |
| 2005/0097561 A1 | 5/2005 | Schumacher et al. |
| 2005/0102325 A1 | 5/2005 | Gould et al. |
| 2005/0102670 A1 | 5/2005 | Bretl et al. |
| 2005/0114778 A1 | 5/2005 | Branson et al. |
| 2005/0144277 A1 | 6/2005 | Flurry et al. |
| 2005/0144596 A1 | 6/2005 | McCullough et al. |
| 2005/0149935 A1 | 7/2005 | Benedetti |
| 2005/0172268 A1 | 8/2005 | Kuturiano et al. |
| 2005/0177531 A1 | 8/2005 | Bracewell |
| 2005/0193056 A1 | 9/2005 | Schaefer et al. |
| 2005/0216421 A1 | 9/2005 | Barry et al. |
| 2005/0240621 A1 | 10/2005 | Robertson et al. |
| 2005/0262470 A1 | 11/2005 | Gavrilov |
| 2005/0289527 A1 | 12/2005 | Illowsky et al. |
| 2006/0085462 A1 | 4/2006 | Todd |
| 2006/0095722 A1 | 5/2006 | Biles et al. |
| 2006/0098017 A1 | 5/2006 | Tarditi et al. |
| 2006/0130041 A1 | 6/2006 | Pramanick et al. |
| 2006/0206872 A1 | 9/2006 | Krishnaswamy |
| 2006/0282474 A1 | 12/2006 | MacKinnon |
| 2006/0294150 A1 | 12/2006 | Stanfill et al. |
| 2006/0294459 A1 | 12/2006 | Davis et al. |
| 2007/0011668 A1 | 1/2007 | Wholey et al. |
| 2007/0022077 A1* | 1/2007 | Stanfill .............. G06F 9/50 706/52 |
| 2007/0027138 A1 | 2/2007 | Jordis et al. |
| 2007/0035543 A1 | 2/2007 | David et al. |
| 2007/0094211 A1 | 4/2007 | Sun et al. |
| 2007/0118839 A1 | 5/2007 | Berstis et al. |
| 2007/0139441 A1 | 6/2007 | Lucas et al. |
| 2007/0143360 A1 | 6/2007 | Harris et al. |
| 2007/0150429 A1 | 6/2007 | Huelsman et al. |
| 2007/0174185 A1 | 7/2007 | McGoveran |
| 2007/0179923 A1 | 8/2007 | Stanfill |
| 2007/0198971 A1 | 8/2007 | Dasu |
| 2007/0239766 A1 | 10/2007 | Papaefstathiou et al. |
| 2007/0271381 A1 | 11/2007 | Wholey et al. |
| 2007/0271562 A1 | 11/2007 | Schumacher et al. |
| 2007/0279494 A1 | 12/2007 | Aman et al. |
| 2007/0285440 A1 | 12/2007 | MacInnis et al. |
| 2008/0049022 A1 | 2/2008 | Sherb et al. |
| 2008/0126755 A1 | 5/2008 | Wu et al. |
| 2008/0134138 A1 | 6/2008 | Chamieh |
| 2008/0244524 A1 | 10/2008 | Kelso |
| 2008/0250049 A1 | 10/2008 | Chakra et al. |
| 2008/0288608 A1 | 11/2008 | Johnson |
| 2008/0288856 A1 | 11/2008 | Goranson |
| 2008/0294615 A1 | 11/2008 | Furuya et al. |
| 2009/0030863 A1 | 1/2009 | Stanfill et al. |
| 2009/0064147 A1 | 3/2009 | Beckerle et al. |
| 2009/0083313 A1 | 3/2009 | Stanfill et al. |
| 2009/0113196 A1 | 4/2009 | Jan et al. |
| 2009/0182728 A1 | 7/2009 | Anderson |
| 2009/0193391 A1 | 7/2009 | Miller et al. |
| 2009/0193417 A1 | 7/2009 | Kahlon |
| 2009/0224941 A1 | 9/2009 | Kansal et al. |
| 2009/0235267 A1 | 9/2009 | McKinney et al. |
| 2009/0245426 A1 | 10/2009 | Ratnakar et al. |
| 2009/0313625 A1 | 12/2009 | Sharoff |
| 2009/0327196 A1 | 12/2009 | Studer et al. |
| 2010/0042976 A1 | 2/2010 | Hines |
| 2010/0070955 A1 | 3/2010 | Kahlon |
| 2010/0169137 A1 | 7/2010 | Jastrebski et al. |
| 2010/0174694 A1 | 7/2010 | Staebler et al. |
| 2010/0180344 A1* | 7/2010 | Malyshev ............ G06F 21/566 726/23 |
| 2010/0211953 A1 | 8/2010 | Wakeling et al. |
| 2010/0218031 A1 | 8/2010 | Agarwal et al. |
| 2010/0281462 A1 | 11/2010 | Festa |
| 2010/0281488 A1 | 11/2010 | Krishnamurthy et al. |
| 2011/0078500 A1 | 3/2011 | Douros et al. |
| 2011/0093433 A1 | 4/2011 | Stanfill et al. |
| 2011/0307897 A1 | 12/2011 | Atterbury et al. |
| 2012/0023508 A1 | 1/2012 | Flores et al. |
| 2012/0036498 A1 | 2/2012 | Akirekadu et al. |
| 2012/0054255 A1 | 3/2012 | Buxbaum |
| 2012/0102029 A1 | 4/2012 | Larson et al. |
| 2012/0151419 A1 | 6/2012 | Kent et al. |
| 2012/0216176 A1 | 8/2012 | Gaikwad et al. |
| 2012/0222017 A1 | 8/2012 | Hinkle |
| 2012/0233599 A1 | 9/2012 | Valdiviezo et al. |
| 2012/0266074 A1 | 10/2012 | Bhoovaraghavan et al. |
| 2013/0124392 A1 | 5/2013 | Achanta |
| 2013/0167241 A1 | 6/2013 | Siman |
| 2013/0290928 A1 | 10/2013 | Johnson |
| 2014/0068566 A1 | 3/2014 | Coronado et al. |
| 2015/0160926 A1 | 6/2015 | Larson et al. |
| 2015/0160927 A1 | 6/2015 | Stevens et al. |

FOREIGN PATENT DOCUMENTS

| | | |
|---|---|---|
| CN | 101702942 | 5/2010 |
| EP | 0834810 | 4/1998 |
| JP | 64-013189 | 1/1989 |
| JP | H01-094431 | 4/1989 |
| JP | 06-236276 | 8/1994 |
| JP | H08-106540 | 4/1996 |
| JP | 08-278892 | 10/1996 |
| JP | 08-305576 | 11/1996 |
| JP | 63-231613 | 9/1998 |
| JP | 11-184766 | 7/1999 |
| JP | 2000-010788 | 1/2000 |
| JP | 2000-99317 | 4/2000 |
| JP | 2000-514219 | 10/2000 |
| JP | 2001-022571 | 1/2001 |
| JP | 2002-229943 | 8/2002 |
| JP | 2005-317010 | 11/2005 |
| JP | 2006-504160 | 2/2006 |
| JP | 2006-133986 | 5/2006 |
| WO | WO 98/00791 | 1/1998 |
| WO | 02/11344 | 2/2002 |
| WO | 2005/001687 | 1/2005 |
| WO | 2005/086906 | 9/2005 |
| WO | 2008/124319 | 10/2008 |
| WO | 2009/039352 | 3/2009 |
| WO | 2014/011708 | 1/2014 |

OTHER PUBLICATIONS

Baer, J.L. et al., "Legality and Other Properties of Graph Models of Computations." Journal of the Association for Computing Machinery, vol. 17, No. 3, Jul. 1970, pp. 543-554.

Bookstein, A. et al., "Modeling Word Occurrences for the Compression of Concordances." ACM Transactions on Information Systems, vol. 15, No. 3, Jul. 1997, pp. 254-290.

Burch, J.R. et al., "Sequential circuit verification using symbolic model checking." In Design Automation Conference, 1990, Proceedings of the 27th ACM/IEEE. Jun. 24-28, 1990, pp. 46-51.

Control-M; New Dimension Software. User Manual. New Dimension Software Ltd., 1999.

Cytron, Ron et al., "Efficiently Computing Static Single Assignment Form and the Control Dependence Graph." ACM Transactions on Programming Languages and Systems, vol. 13, No. 4, Oct. 1991, pp. 451-490.

Dillon, Laura K., et al., "Inference Graphs: A Computational Structure Supporting Generation of Customizable and Correct Analysis Components," IEEE Transactions on Software Engineering, vol. 29, No. 2, Feb. 2003, pp. 133-150.

European Examination Report issued in related EP Application No. 10 741 775.0 on Jul. 7, 2014.

(56) References Cited

OTHER PUBLICATIONS

Ebert, Jurgen et al., "A Declarative Approach to Graph-Based Modeling." Workshop on Graph-Theoretic Concepts in Computer Science, 1994, pp. 1-19.
European Search Report issued in application No. EP10003554, dated Sep. 24, 2010, 7 pages.
European Search Report issued in application No. EP10741775, dated Nov. 14, 2012, 4 pages.
Evripidou, Paraskevas, et al., "Incorporating input/output operations into dynamic data-flow graphs," Parallel Computing 21 (1995) 1285-1311.
Extended European Search Report, EP 12165575, mailed May 10, 2013, 9 pages.
Frankl, Phyllis G., et al., "An Applicable Family of Data Flow Testing Criteria," IEEE Transactions on Sofrware Engineering, vol. 14, No. 10, Oct. 1988, pp. 1483-1498.
Gamma et al. "Design Patterns: Elements of Reusable Object-Oriented Software", Sep. 1999.
Guyer et al., "Finding Your Cronies: Static Analysis for Dynamic Object Colocation." Oct. 2004, ACM, pp. 237-250.
Grove et al., "A Framework for Call Graph Construction Algorithms." Nov. 2001, ACM TOPLAS, vol. 23, Issue 6, pp. 685-746.
Herniter, Marc E., "Schematic Capture with MicroSim PSpice," $2_{nd}$ Edition, Prentice Hall, Upper Saddle River, N.J., 1996, pp. 51-52, 255-280, 292-297.
International Search Report & Written Opinion issued in PCT application No. PCT/US01/23552, mailed Jan. 24, 2002, 5 pages.
International Search Report & Written Opinion issued in PCT application No. PCT/US06/24957, dated Jan. 17, 2008, 14 pages.
International Search Report & Written Opinion issued in PCT application No. PCT/US07/75576, mailed Sep. 16, 2008, 13 pages.
International Search Report & Written Opinion issued in PCT application No. PCT/US08/71206, mailed Oct. 22, 2008, 12 pages.
International Search Report & Written Opinion issued in PCT application No. PCT/US10/49966, dated Nov. 23, 2010, 8 pages.
International Search Report & Written Opinion received in PCT application No. PCT/US10/24036, mailed Mar. 23, 2010, 11 pages.
International Search Report & Written Opinion received in PCT application No. PCT/US2011/040440, mailed Oct. 12, 2011, 13 pages.
International Search Report & Written Opinion received in PCT application No. PCT/US2013/070386, mailed Feb. 12, 2014, 7 pages.
International Search Report & Written Opinion received in PCT application No. PCT/US2013/076416, mailed Apr. 9, 2014, 10 pages.
Japanese Office Action, with English Translation, JP application No. 2008-519474, mailed Sep. 25, 2012, 8 pages.
Japanese Office Action, with English Translation, JP application No. 2009-523997, mailed Oct. 23, 2012, 7 pages.
Japanese Office Action, with English Translation, JP application No. 2011-000948, mailed Jan. 8, 2013, 11 pages.
Japanese Office Action, with English Translation, JP application No. 2010-518415, mailed Feb. 21, 2013, 11 pages.
Japanese Office Action for Japanese Application No. 2010-518415, with English Translation, dated Nov. 18, 2013, 11 pages.
Jawadi, Ramamohanrao et al., "A Graph-based Transaction Model for Active Databases and its Parallel Implementation." U. Florida Tech. Rep TR94-0003, 1994, pp. 1-29.
Just et al., "Review and Analysis of Synthetic Diversity for Breaking Monocultures." Oct. 2004, ACM, pp. 23-32.
Kebschull, U. et al., "Efficient Graph-Based Computation and Manipulation of Functional Decision Diagrams." University of Tubingen, 1993 IEEE, pp. 278-282.
Krahmer et al., "Graph-Based Generation of Referring Expressions." Mar. 2003, MIT Press, vol. 29, No. 1, pp. 53-72.
Krsul, Ivan et al., "VMPlants: Providing and Managing Virtual Machine Execution Environments for Grid Computing." Proceedings of the ACM/IEEE SC2004 Conference on Supercomputing, 2001, Nov. 6-12, 2004, 12 pages.
Li, Xiqing et al., "A Practical External Sort for Shared Disk MPPs." Proceedings of Supercomputing '93, 1993, 24 pages.
Martin, David et al., "Models of Computations and Systems—Evaluation of Vertex Probabilities in Graph Models of Computations." Journal of the Association for Computing Machinery, vol. 14, No. 2, Apr. 1967, pp. 281-299.
Mattson et al., "Patterns for Parallel Programming," Addison-Wesley Professional ISBN: 0-321-22811-1 (2004).
Ou, Chao-Wei et al., "Architecture-Independent Locality-Improving Transformations of Computational Graphs Embedded in κ-Dimensions." Proceedings of the $9^{th}$ International Conference on Supercomputing, 1995, pp. 289-298.
"RASSP Data Flow Graph Design Application Note." International Conference on Parallel Processing, Dec. 2000, Retrieved from Internet <http://www.atl.external.lmco.com/projects/rassp/RASSP_legacy/appnotes/FLOW/APNOTE_FLOW_02 >, 5 pages.
Romberg, M., "Unicore: Beyond Web-based Job-Submission," Proceedings of the 42nd Cray User Group Conference, Noordwijk (May 22-26, 2000).
Russell, Nick, et al., "Workflow Control-Flow Patterns A Revised View," Workflow Patterns Initiative, 2006, pp. 1-134.
Shoten, Iwanami, "Encyclopedic Dictionary of Computer Science," (with English Translation), May 25, 1990, p. 741.
Stanfill, Craig, "Massively Parallel Information Retrieval for Wide Area Information Servers." 1991 IEEE International Conference on Systems, Man and Cybernetics, Oct. 1991, pp. 679-682.
Stanfill, Craig et al., "Parallel Free-Text Search on the Connection Machine System." Communications of the ACM, vol. 29, No. 12, Dec. 1986, pp. 1229-1239.
Stanfill, Craig, "The Marriage of Parallel Computing and Information Retrieval." IEE Colloquium on Parallel Techniques for Information Retrieval, Apr. 1989, 5 pages.
Supplemental European Search Report issued in application No. EP07813940, dated Nov. 26, 2009, 7 pages.
Supplemental European Search Report issued in application No. EP08796632, dated Sep. 24, 2010, 6 pages.
Supplemental European Search Report issued in application No. EP06774092, dated Dec. 19, 2012, 5 pages.
"Topological sorting," Wikipedia, accessed Dec. 10, 2012, 2 pages.
"Unicenter AutoSys Job Management," Computer Associates, Copyright 2001.
Van der Aalst, W.M.P., et al., "Workflow Patterns," Distributed and Parallel Databases, 14, 5-51, 2003.
Vajracharya, Suvas et al., "Asynchronous Resource Management." Proceedings of the $15^{th}$ International Parallel and Distributed Processing Symposium, Apr. 2001, 10 pages.
"Visual Lint: Squash Bugs Early with Interactive C/C++, C# and Java Code Analysis for Microsoft Visual Studio and Eclipse," [ retrieved from the internet Dec. 3, 2012: www.riverblade.co.uk/products/visual_lint.] (2 pages).
Wah, B.W. et al., "Report on Workshop on High Performance Computing and Communications for Grand Challenge Applications: Computer Vision, Speech and Natural Language Processing, and Artificial Intelligence." IEEE Transactions on Knowledge and Data Engineering, vol. 5, No. 1, Feb. 1993, 138-154.
Whiting, Paul G., et al., "A History of Data-Flow Languages," IEEE Annals of the History of Computing, vol. 16, No. 4, 1994, pp. 38-59.
Chinese Office Action issued in CN 201180039226.7, issued May 4, 2015 (24 pages).
International Search Report and Written Opinion, PCT/US2014/068754, mailed May 8, 2015 (17 pages).
European Examination report issued in EP 06 785 623.7 on Nov. 24, 2014, 5 pages.
De Pauw et al., "Web Services Navigator: visualizing the execution of Web Services," XP2477231, ISSN: 0018-8670, Jan. 1, 2005.
Transaction History, U.S. Appl. No. 09/627,252, Mar. 11, 2016, 2 pages.
Transaction History, U.S. Appl. No. 10/268,509, Mar. 11, 2016, 2 pages.
Transaction History, U.S. Appl. No. 11/467,724, Mar. 11, 2016, 2 pages.

(56) References Cited

OTHER PUBLICATIONS

Transaction History, U.S. Appl. No. 11/733,579, Mar. 11, 2016, 2 pages.
Transaction History, U.S. Appl. No. 11/169,014, Mar. 11, 2016, 2 pages.
Transaction History, U.S. Appl. No. 11/167,902, Mar. 11, 2016, 3 pages.
Transaction History, U.S. Appl. No. 12/977,545, Mar. 11, 2016, 6 pages.
Transaction History, U.S. Appl. No. 11/836,349, Mar. 11, 2016, 5 pages.
Transaction History, U.S. Appl. No. 12/704,998, Mar. 11, 2016, 4 pages.
Transaction History, U.S. Appl. No. 13/161,010, Mar. 11, 2016, 5 pages.
Transaction History, U.S. Appl. No. 12/638,588, Mar. 11, 2016, 4 pages.
Transaction History, U.S. Appl. No. 13/678,921, Mar. 11, 2016, 3 pages.
Transaction History, U.S. Appl. No. 13/678,928, Mar. 11, 2016, 3 pages.
Transaction History, U.S. Appl. No. 13/733,403, Mar. 11, 2016, 1 page.
Transaction History, U.S. Appl. No. 14/165,698, Mar. 11, 2016, 2 pages.
Transaction History, U.S. Appl. No. 14/561,494, Mar. 11, 2016, 2 pages.
Transaction History, U.S. Appl. No. 14/561,435, Mar. 11, 2016, 1 page.
Transaction History, U.S. Appl. No. 12/180,141, Mar. 4, 2016, 5 page.
Japanese Office Action for Japanese Application No. 2013-515468, mailed Jul. 24, 2015, 4 pages.
Examination Report in India Application 250CHENP2009, Aug. 31, 2016 (7 pages).
Bernstein and Newcomer, "Principles of Transaction Processing, 2$^{nd}$ Edition", Morgan Kaufmann, XP002739946 (Jul. 24, 2009).
Canadian Office Action in Application No. 2,750,279, dated Mar. 24, 2016.
Canadian Office Action in Application No. 2,801,573, dated Apr. 13, 2016.
Chinese Office Action (English Translation) in Application No. 2010-80042716.8, mailed Apr. 8, 2016 (14 pages).
Chinese Office Action (with English Translation) in Application No. 2006-800231781, dated Jan. 12, 2016, 15 pages.
Chinese Office Action in Application No. 200680023178.1, issued Apr. 14, 2016 (10 pages) (English translation).
Examination Report in Application No. IN 10117/DELNP/2007, dated Dec. 22, 2015.
IBM: "Concepts and Architecture—Version 3.6," Internet citation, http://publibfp.boulder.ibm.com.epubs/pdf/h1262857, retrieved Apr. 19, 2007.
Japanese Office Action (English Translation) in application No. JP2014-077798, mailed Nov. 11, 2015 (6 pages).
Japanese Office Action in Application No. 2014-159008, mailed May 31, 2015 (English Translation) (4 pages).
Karasawa, K.; Iwata, M.; and Terada, H.—"Direct generation of data-driven program for stream-oriented processing"—Published in: Parallel Architctures and Compilation Techniques., 1997. Proceedings., 1997 International Conference on; Nov. 10-14, 1997 San Francisco, CA—pp. 295-306.
Korean Office Action in Application No. 10-2011-7019122, dated Jan. 18, 2016.
Korean Office action in Application No. 10-2013-7001038, dated Dec. 11, 2015.
Korean Office Action in Application No. 10-2015-7008131, dated Apr. 1, 2016, 5 pages.
Rajesh K. Gupta and Giovanni de Micheli—"A co-synthesis approach to embedded system design automation" Design Automation for Embedded Systems, vol. 1, issue 1-2, 69-120.
Supplemental European Search Report issued in EP 13 80 2160 on Jul. 6, 2016 (6 pages).
Supplemental European Search Report issued in EP10819444, on Jun. 3, 2015.
"Modular programming" Wikipedia, retrieved Feb. 10, 2009 (2 pages).
"System integration" Wikipedia, retrieved Jan. 25, 2009 (3 pages).

* cited by examiner

DYNAMICALLY LOADING GRAPH-BASED COMPUTATIONS

CROSS-REFERENCE TO RELATED APPLICATIONS

This application is a continuation of and claims priority to U.S. patent application Ser. No. 13/161,010, now U.S. Pat. No. 8,875,145, filed Jun. 15, 2011 incorporated herein by reference, which claims priority to U.S. Application Ser. No. 61/355,129, filed on Jun. 15, 2010, incorporated herein by reference.

BACKGROUND

This description relates to dynamically loading graph-based computations.

Complex computations can often be expressed as a data flow through a directed graph (called a "dataflow graph"), with components of the computation being associated with the vertices of the graph and data flows between the components corresponding to links (arcs, edges) of the graph. The components can include data processing components that receive data at one or more input ports, process the data, and provide data from one or more output ports, and dataset components that act as a source or sink of the data flows. A system that implements such graph-based computations is described in U.S. Pat. No. 5,966,072, EXECUTING COMPUTATIONS EXPRESSED AS GRAPHS.

SUMMARY

In a general aspect, a method for processing data in a data processing system using compiled dataflow graphs stored in a data storage system includes: receiving multiple units of work that each include one or more work elements; and processing a first unit of work using a first compiled dataflow graph loaded into the data processing system in response to receiving the first unit of work. The first compiled dataflow graph has been compiled into data structures representing a first dataflow graph that includes nodes representing data processing components connected by links representing flows of work elements between data processing components. The processing includes analyzing the first unit of work to determine a characteristic of the first unit of work; identifying one or more compiled dataflow graphs from multiple compiled dataflow graphs stored in the data storage system that include at least some compiled dataflow graphs that were compiled, before the first unit of work was received, for processing a unit of work having the determined characteristic of the first unit of work; loading one of the identified one or more compiled dataflow graphs into the data processing system as the first compiled dataflow graph; and generating one or more output work elements from at least one work element in the first unit of work using the first dataflow graph.

Aspects can include one or more of the following features.

The multiple units of work correspond to different contiguous sets of one or more work elements within a flow of received work elements.

The multiple units of work correspond to different batches of one or more work elements within different respective received files.

The loading further includes retrieving data structures representing the first dataflow graph from the first compiled dataflow graph and loading the retrieved data structures into a second dataflow graph.

The second dataflow graph was running before the first unit of work was received.

Loading the retrieved data structures into the second dataflow graph includes embedding the first dataflow graph within a containing component of the second dataflow graph that is configured to provide a first process to execute the data processing components in the first dataflow graph.

The containing component of the second dataflow graph is further configured to provide a second process to monitor execution of the data processing components in the first dataflow graph.

The second process, in response to detecting a failure of at least one data processing component in the first dataflow graph to correctly process a given work element, interrupts execution of the first dataflow graph without interrupting execution of the second dataflow graph.

The second process, in response to detecting a delay of at least one data processing component in the first dataflow graph in processing the first unit of work, suspends execution of the first dataflow graph without interrupting execution of the second dataflow graph and embeds a third dataflow graph within the containing component of the second dataflow graph to process a second unit of work received after the first unit of work.

The containing component of the second dataflow graph is further configured to provide a first application programming interface that the first process uses to communicate with a second process that accesses a library for a first remote database.

The containing component of the second dataflow graph is further configured to provide a second application programming interface that the first process uses to communicate with a third process that accesses a library for a second remote database different from the library for the first remote database.

The containing component of the second dataflow graph is further configured to provide a third application programming interface that is compatible with multiple components of the second dataflow graph.

The containing component of the second dataflow graph is further configured to translate application calls using the third application programming interface into application calls using a selected one of the first or second application programming interface based on which of the first or second remote database is being accessed.

Loading the retrieved data structures into the second dataflow graph includes embedding the first dataflow graph within a containing component of the second dataflow graph, the embedding including: connecting a flow of input work elements received from a link connected to an input of the containing component to an input of the first dataflow graph, and connecting the generated one or more output work elements to a link connected to an output of the containing component.

The first dataflow graph includes a first component that includes at least one output link connected to an input of a second component, instructions to provide the input work elements to the second component when the first dataflow graph is embedded within the containing component, and instructions to provide work elements from a storage location to the second component when the first dataflow graph is not embedded within the containing component.

The first dataflow graph includes a third component that includes at least one input link connected to an output of a fourth component, instructions to provide the generated one or more output work elements from the output of the fourth component to the output of the containing component when the first dataflow graph is embedded within the containing component, and instructions to provide the generated one or more output work elements from the output of the fourth component to a storage location when the first dataflow graph is not embedded within the containing component.

The first dataflow graph includes multiple interface components that each include instructions for sending work elements between the first dataflow graph and the containing component when the first dataflow graph is embedded within the containing component, and instructions for sending work elements between the first dataflow graph and a storage location when the first dataflow graph is not embedded within the containing component.

Each of the interface components identifies a different corresponding input or output port of the containing component to which the first dataflow graph is connected when the first dataflow graph is embedded within the containing component.

The method further includes, after generating the one or more output work elements, unloading the retrieved data structures representing the first dataflow graph from the second dataflow graph.

The method further includes buffering work elements that are in units of work that arrive after the first unit of work arrives and before the unloading of the retrieved data structures representing the first dataflow graph.

The method further includes loading a second compiled dataflow graph loaded into the data processing system, the second compiled dataflow graph having been compiled into data structures representing a second dataflow graph.

Loading one of the identified one or more compiled dataflow graphs into the data processing system as the first compiled dataflow graph includes embedding the first dataflow graph within a first containing component of a third dataflow graph, and loading the second compiled dataflow graph into the data processing system includes embedding the second dataflow graph within a second containing component of the third dataflow graph.

The second compiled dataflow graph is loaded into the data processing system in response to receiving the first unit of work.

The second compiled dataflow graph is loaded into the data processing system in response to receiving a second unit of work after the first unit of work.

The method further includes processing a second unit of work after processing the first unit of work, using a second compiled dataflow graph loaded into the data processing system in response to receiving the second unit of work, the second compiled dataflow graph having been compiled into data structures representing a second dataflow graph, the processing including: analyzing the second unit of work to determine a characteristic of the second unit of work; identifying one or more compiled dataflow graphs from the multiple compiled dataflow graphs stored in the data storage system that were compiled, before the second unit of work was received, for processing a unit of work having the determined characteristic of the second unit of work; loading one of the identified one or more compiled dataflow graphs into the data processing system as the second compiled dataflow graph; and generating one or more output work elements from at least one work element in the second unit of work using the second dataflow graph.

Loading one of the identified one or more compiled dataflow graphs into the data processing system as the first compiled dataflow graph includes embedding the first dataflow graph within a containing component of a third dataflow graph, and loading one of the identified one or more compiled dataflow graphs into the data processing system as the second compiled dataflow graph includes embedding the second dataflow graph within the containing component of the third dataflow graph.

Analyzing the first unit of work includes reading an identifier for a compiled dataflow graph included within a work element of the first unit of work.

Identifying the one or more compiled dataflow graphs includes matching the identifier to identifiers associated with the one or more compiled dataflow graphs.

Analyzing the first unit of work includes identifying one of multiple predetermined types characterizing a work element of the first unit of work.

Identifying the one or more compiled dataflow graphs includes determining that dataflow graphs corresponding to the one or more compiled dataflow graphs are configured to process a work element characterized by the identified type.

Analyzing the first unit of work includes identifying a property of content included within a work element of the first unit of work.

Identifying the one or more compiled dataflow graphs includes determining that dataflow graphs corresponding to the one or more compiled dataflow graphs are configured to process a work element that includes content having the identified property.

Analyzing the first unit of work includes determining one or more values associated with the first unit of work that are designated as values for a first set of one or more parameters of the first dataflow graph.

Identifying the one or more compiled dataflow graphs includes determining that the identified one or more compiled dataflow graphs were compiled into data structures representing the first dataflow graph with the first set of one or more parameters bound to respective values that match the determined one or more values associated with the first unit of work.

Loading one of the identified one or more compiled dataflow graphs into the data processing system as the first compiled dataflow graph includes binding a second set of one or more parameters to respective values determined based at least in part on the first unit of work.

The second set of one or more parameters includes at least one parameter whose value includes the name of an input source for providing input work elements or output source for receiving output work elements.

The first set of one or more parameters includes at least one parameter whose value determines whether one or more components are to be included in the data structures representing the first dataflow graph when the data structures are compiled into the first compiled dataflow graph.

The first set of one or more parameters includes at least one parameter whose value determines a transformation to be applied to work elements that are processed by a component that is included in the data structures representing the first dataflow graph when the data structures are compiled into the first compiled dataflow graph.

The method further includes, before the first unit of work is received, compiling the first compiled dataflow graph from data structures representing the first dataflow graph with the first set of one or more parameters bound to respective values.

The method further includes storing the first compiled dataflow graph in the data storage system and associating the stored first compiled dataflow graph with information indicating the respective values that were bound to the first set of one or more parameters.

In another aspect, in general, a data processing system for processing data using compiled dataflow graphs stored in a data storage system includes: an input device or port configured to receive multiple units of work that each include one or more work elements; and at least one processor configured to process a first unit of work using a first compiled dataflow graph loaded into the data processing system in response to receiving the first unit of work. The first compiled dataflow graph has been compiled into data structures representing a first dataflow graph that includes nodes representing data processing components connected by links representing flows of work elements between data processing components. The processing includes analyzing the first unit of work to determine a characteristic of the first unit of work; identifying one or more compiled dataflow graphs from multiple compiled dataflow graphs stored in the data storage system that include at least some compiled dataflow graphs that were compiled, before the first unit of work was received, for processing a unit of work having the determined characteristic of the first unit of work; loading one of the identified one or more compiled dataflow graphs into the data processing system as the first compiled dataflow graph; and generating one or more output work elements from at least one work element in the first unit of work using the first dataflow graph.

In another aspect, in general, a data processing system for processing data using compiled dataflow graphs stored in a data storage system includes: means for receiving multiple units of work that each include one or more work elements; and means for processing a first unit of work using a first compiled dataflow graph loaded into the data processing system in response to receiving the first unit of work. The first compiled dataflow graph has been compiled into data structures representing a first dataflow graph that includes nodes representing data processing components connected by links representing flows of work elements between data processing components. The processing includes analyzing the first unit of work to determine a characteristic of the first unit of work; identifying one or more compiled dataflow graphs from multiple compiled dataflow graphs stored in the data storage system that include at least some compiled dataflow graphs that were compiled, before the first unit of work was received, for processing a unit of work having the determined characteristic of the first unit of work; loading one of the identified one or more compiled dataflow graphs into the data processing system as the first compiled dataflow graph; and generating one or more output work elements from at least one work element in the first unit of work using the first dataflow graph.

In another aspect, in general, a computer-readable medium stores a computer program for processing data in a data processing system using compiled dataflow graphs stored in a data storage system. The computer program includes instructions for causing a computer to: receive multiple units of work that each include one or more work elements; and process a first unit of work using a first compiled dataflow graph loaded into the data processing system in response to receiving the first unit of work. The first compiled dataflow graph has been compiled into data structures representing a first dataflow graph that includes nodes representing data processing components connected by links representing flows of work elements between data processing components. The processing includes analyzing the first unit of work to determine a characteristic of the first unit of work; identifying one or more compiled dataflow graphs from multiple compiled dataflow graphs stored in the data storage system that include at least some compiled dataflow graphs that were compiled, before the first unit of work was received, for processing a unit of work having the determined characteristic of the first unit of work; loading one of the identified one or more compiled dataflow graphs into the data processing system as the first compiled dataflow graph; and generating one or more output work elements from at least one work element in the first unit of work using the first dataflow graph.

Aspects of the invention can include one or more of the following advantages.

A data processing system that uses dataflow graphs can be configured in different ways to process an input flow of data made up of individual work elements. Each work element can represent a separate unit of work, or a series of multiple work elements can represent a unit of work. The techniques described herein can be used for a variety of configurations of such a system. Some configurations may be more appropriate for units of work within the data flow that have certain characteristics. In some cases, one or more work elements in a unit of work are provided to a dataflow graph for processing as a batch (e.g., a batch of work elements consisting of records within the same input file), where the dataflow graph passes data flows of work elements from one or more input ports to one or more output ports for a single batch at a time. The series of "output work elements" provided from the output port(s) of downstream components (and optionally stored in dataset components) represent results of processing the series of "input work elements" provided to the input port(s). In one form of batch processing, the dataflow graph starts up when the first input work element of a batch is ready and terminates after the last output work element has been provided. In another form of batch processing, the dataflow graph continues running from one batch to the next while making sure that the last output work element from the previous batch is output before the first input work element from the next batch is processed. In this latter form of batch processing, there may be a continuous stream of work elements segmented into units of work each consisting of one or more work elements that represent a batch. Some of the techniques described herein show how to dynamically load a given dataflow graph in response to detecting a predetermined characteristic associated with a received unit of work. In some cases the characteristic is based on the content of the unit of work (e.g., format of a file), and in some cases the characteristic is based on parameter values associated with the unit of work (e.g., a parameter determining whether a particular conditional component is to be included), as described in more detail below.

In some configurations, a data processing system may execute dataflow graphs to process batches of data such that a dataflow graph runs for a relatively short period of time (e.g., on the order of seconds) to process a given batch of data. If many small batches are processed by selected dataflow graphs (e.g., selected from a collection of dataflow graphs), performance can be improved significantly if the execution time of a selected dataflow graph is not dominated by "startup time" (the time it takes for the graph to be loaded and ready to start processing the batch of data from initiation of the graph). For example, if the startup time of a dataflow graph is about five seconds and it takes about five seconds to process the batch of data, then only half the execution time is used for useful data processing. In some cases, this low ratio of processing time to execution time may not impact overall efficiency if the batches are arriving infrequently (e.g., every few minutes in this example). However, if batches are arriving relatively frequently (e.g., every few seconds in this example), then startup time can significantly affect overall efficiency. Performance can be improved by moving some of the tasks that would have been performed during the startup time into an earlier compilation phase, as described herein.

In some configurations, a data processing system may execute dataflow graphs to process a continuous flow of data such that a dataflow graph runs continuously processing a series of work elements in a flow of data. The work elements can be divided into units of work consisting of one or more of the work elements, and each unit of work may need to be processed by a different dataflow graph as a batch. Performance can be improved significantly if the different dataflow graphs are dynamically loaded into a running container graph on demand (e.g., as opposed to keeping all of the different dataflow graphs running independently, or combining them into a single large dataflow graph). For example, the units of work may consist of a single message of a given type. Some types of messages may be more frequent than others. So, by loading the appropriate dataflow graph to handle a given type of message (instead of running all the dataflow graphs for all the different types of messages concurrently), the resources that would have been used to keep the more infrequently used dataflow graphs running can be freed for other purposes. Additionally, keeping the dataflow graphs separate instead of combining them into a large dataflow graph provides the modularity that enables easy design of custom dataflow graphs for different types of messages and facilitates a developer's understanding of the entire system upon inspection of the container graph. A developer can easily change how some types of messages are handled by changing the corresponding dataflow graph, and can easily add or remove dataflow graphs as messages types are added or removed.

The techniques described herein can be used to compile different customized versions of dataflow graphs that can be loaded dynamically at run time with appropriate parameter values for processing a received batch of data. In some implementations, the compiled dataflow graphs can be used as "micrographs" that can be dynamically loaded (and unloaded) into (and out of) a containing dataflow graph while that containing dataflow graph is running. The micrograph provides an efficient way to process different units of work within a continuous flow of data as a batch while the continuous flow of data is being processed by the dataflow graph. In some cases, micrographs are loaded as subgraphs within a containing dataflow graph using a specialized component for loading the micrograph, as described in more detail below. Techniques for compiling dataflow graphs (including micrographs) enable some of the startup procedures to be performed ahead of time while still allowing flexibility at run-time by selecting among different compiled versions of a dataflow graph in response to a received batch of data (including a unit of work within a flow of data).

Other features and advantages of the invention will become apparent from the following description, and from the claims.

DESCRIPTION

1 Overview

Figure 1:
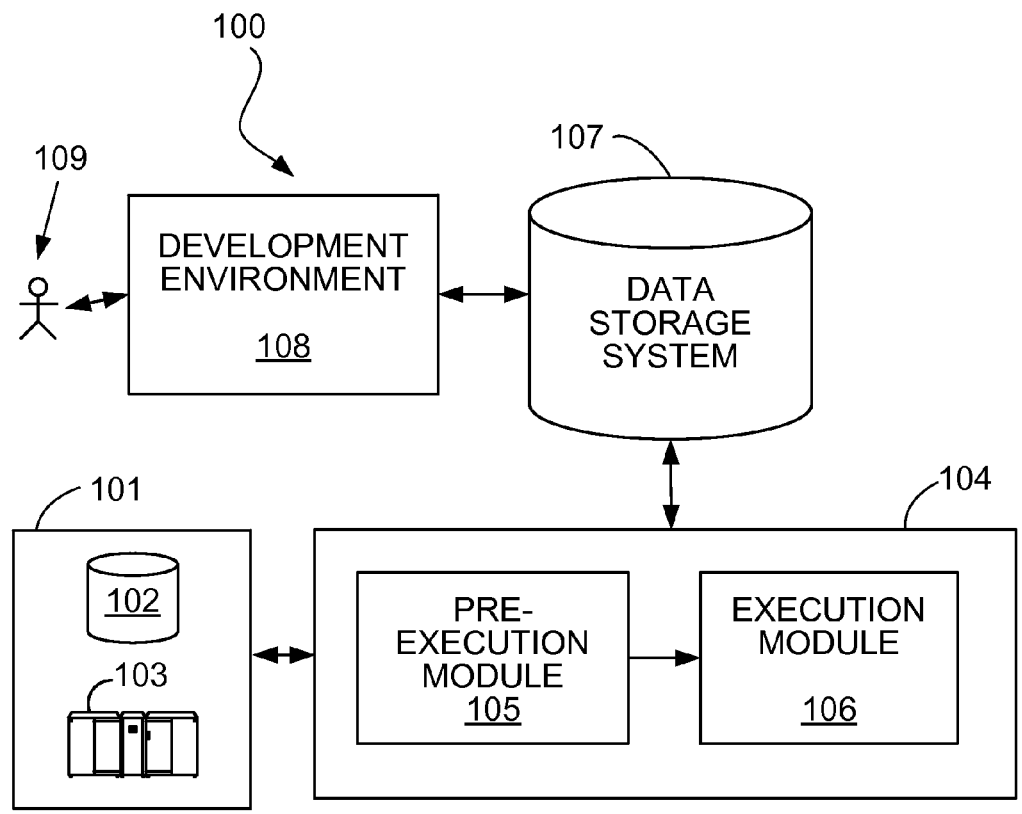
FIG. 1 is a block diagram of an example arrangement of a system in which a dataflow graph is executed.

FIG. 1 shows an exemplary data processing system 100 in which the dynamic loading techniques can be used. The system 100 includes a data source 101 that may include one or more sources of data such as storage devices or connections to online data streams, each of which may store data in any of a variety of storage formats (e.g., database tables, spreadsheet files, flat text files, or a native format used by a mainframe). An execution environment 104 includes a pre-execution module 105 and an execution module 106. The execution environment 104 may be hosted on one or more general-purpose computers under the control of a suitable operating system, such as the UNIX operating system. For example, the execution environment 104 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via a local area network (LAN) and/or wide-area network (WAN)), or any combination thereof.

The pre-execution module 105 is configured to perform various tasks in preparation for executing dataflow graphs and other executable programs such as compiling dataflow graphs, storing/loading compiled dataflow graphs to/from a data storage system 107 accessible to the execution environment 104, or resolving parameter values and binding the resolved values to parameters. In some cases, the pre-execution module 105 performs tasks (e.g., loading compiled dataflow graphs) in response to data from the data source 101. Storage devices providing the data source 101 may be local to the execution environment 104, for example, being stored on a storage medium connected to a computer running the execution environment 104 (e.g., hard drive 102), or may be remote to the execution environment 104, for example, being hosted on a remote system (e.g., mainframe 103) in communication with a computer running the execution environment 104, over a remote connection.

The execution module 106 uses the compiled dataflow graphs generated by the pre-execution module 105 to generate output data, which can be provided back to the data source 101 and/or stored in the data storage system 107. The data storage system 107 is also accessible to a development environment 108 in which a developer 109 is able to design dataflow graphs. Data structures representing the dataflow graphs can be serialized and stored in the data storage system 107.

The execution module 106 can receive data from a variety of types of systems of the data source 101 including different forms of database systems. The data may be organized as records having values for respective fields (also called "attributes" or "columns"), including possibly null values. When reading data from a data source, an executing dataflow graph may include components that handle initial format information about records in that data source. In some circumstances, the record structure of the data source may not be known initially and may instead be determined after analysis of the data source. The initial information about records can include the number of bits that represent a distinct value, the order of fields within a record, and the type of value (e.g., string, signed/unsigned integer) represented by the bits.

Figure 2:
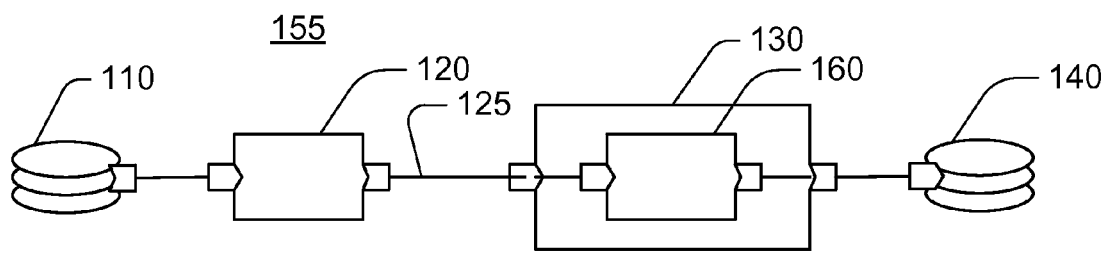
FIG. 2 is an illustration of an exemplary dataflow graph including a micrograph.

Referring to FIG. 2, an example of a dataflow graph 155 that is executed by the execution module 106 allows data from an input data source 110 to be read and processed as a flow of discrete work elements. Different portions of the computations involved with processing the work elements are performed in components 120, 130 that are represented as the vertices (or nodes) of the graph, and data flows between the components that are represented by the links (or arcs, edges) of the graph, such as the link 125 connecting components 120 and 130. A system that implements such graph-based computations is described in U.S. Pat. No. 5,566,072, EXECUTING COMPUTATIONS EXPRESSED AS GRAPHS, incorporated herein by reference. Dataflow graphs made in accordance with this system provide methods for getting information into and out of individual processes represented by graph components, for moving information between the processes, and for defining a running order for the processes. This system includes algorithms that choose interprocess communication methods (for example, communication paths according to the links of the graph can use TCP/IP or UNIX domain sockets, or use shared memory to pass data between the processes).

The process of preparing an uncompiled dataflow graph for execution involves various stages. An uncompiled representation of the dataflow graph is retrieved along with any parameters associated with the dataflow graph that provide values used in the compilation process. During a static parameter resolution phase, static parameters (whose values are designated for resolution before run-time) are resolved and the resolved values are bound to the static parameters. In some cases, in order to resolve the values of the static parameters, calculations are performed to derive certain values (e.g., metadata values, as described in U.S. Publication No. 2006/0294150 entitled "MANAGING METADATA FOR GRAPH-BASED COMPUTATIONS," incorporated herein by reference). Some parameters may be designated as dynamic parameters that are left unresolved to be resolved later at or just before run-time. Components designated as conditional components are removed from the graph (e.g., by being replaced by a dataflow link) if a predetermined condition is not met (or is met), for example, based on a static parameter value. During the compilation phase, data structures representing the dataflow graph, including its components and links, to be used during execution are generated. Compiling can also include compiling embedded scripts in scripting languages into bytecode or machine code. At run-time, any dynamic parameters associated with the dataflow graph are bound to resolved values, and the data structures of the compiled dataflow graph are launched by starting one or more processes, opening any needed files (e.g., files identified by dynamic parameters), and/or linking any dynamic libraries. The processes also perform tasks to set up data flows represented by the links (e.g., allocating shared memory, or opening TCP/IP streams). In some cases, the data structures are configured to execute multiple components in a single process, as described in U.S. Publication No. US 2007/0271381 entitled "MANAGING COMPUTING RESOURCES IN GRAPH-BASED COMPUTATIONS," incorporated herein by reference.

Dataflow graphs can be specified with various levels of abstraction. A "subgraph" which is itself a dataflow graph containing components and links can be represented within another containing dataflow graph as a single component, showing only those links which connect the subgraph to the containing dataflow graph. In some cases, subgraphs are used to hide the components and links of a containing dataflow graph within the development environment 108, but the data representing the components and links are already integrated within the containing dataflow graph. In some embodiments, subgraphs are not initially included in a containing dataflow graph, but are later derived from a "micrograph" that starts as a compiled dataflow graph that includes the data structures representing the components and links to be loaded into the containing dataflow graph, as described in more detail below.

Referring again to FIG. 2, the dataflow graph 155 is able to accept a continuous flow of input data from a data source, which in this example is represented by the dataset component 110. The flow of data is continuous in the sense that, even though it may wax and wane during the operation of the dataflow graph 155, the flow of data does not necessarily have a distinguishable beginning or end, for example, a flow of credit card transactions or orders received in entry systems. Additionally, the dataflow graph 155 is able to provide a continuous flow of output data to an output data repository, which in this example is represented by the dataset component 140. Some dataflow graphs are designed for execution as continuous dataflow graphs that process continuous flows of data for an indefinite period of time, and some dataflow graphs are designed for execution as batch dataflow graphs that begins execution to process a discrete batch of data and then terminates execution after the batch has been processed. The data processing components 120 and 130 of a dataflow graph may contain a series of instructions, a sub-graph, or some combination thereof.

In some arrangements, a specialized component 130 may load a micrograph 160, which is a specialized kind of subgraph configured to be retrieved dynamically and embedded within a containing dataflow graph. A micrograph can be dynamically embedded with a containing component of the containing dataflow graph, such as the specialized component 130. In some arrangements, a micrograph 160 is derived from a data flow graph that was previously compiled and stored in the data storage system 107. In some arrangements, a micrograph 160 remains in an un-compiled form when loaded from the data storage system 107. For example, instead of loading a compiled dataflow graph, the specialized component 130 may initiate a graph compilation procedure to enable the dataflow graph containing the specialized component 130 to be able to execute micrographs that have been compiled just before use. The graph compilation procedure may be performed external to the specialized component 130, or internal to the specialized component

130. In some arrangements, the micrograph 160 is serialized prior to being stored in the data storage system 107. In general, serialization is a process by which a dataflow graph, in a compiled or uncompiled representation, is translated into a binary stream of zeroes and ones so that the dataflow graph is in a form that can easily be stored in persistent memory or in a memory buffer. In implementations in which fast loading of micrographs is desirable, typically the dataflow graph is serialized in a compiled representation with data structures and stored in the data storage system 107, so that the serialized compiled dataflow graph can be easily retrieved and the data structures de-serialized and loaded dynamically at run-time. Compilation is the process by which a computer program, including a program expressed as a dataflow graph, is prepared to be executed by a computer. Compilation may result in the generation of machine code, or instructions ready to be executed on a computer, or in intermediate code which is executed by a virtual machine executing on a computer, for example, Java byte code. In the case of dataflow graphs, compilation includes generation of data structures representing the components and links of the dataflow graph in a form ready to be executed on a computer.

Data flowing through the dataflow graph 155 along the incoming link 125 of the specialized component 130 is temporarily stored in a buffer while the specialized component 130 loads the micrograph 160 and integrates the micrograph 160 into the dataflow graph 155. Similarly, the data flow is allowed to accumulate in a buffer while a micrograph is detached and unloaded from the dataflow graph 155. In some arrangements, a detached micrograph may remain loaded in memory to be accessed later (for example, using a caching mechanism).

The buffering can be configured to use a flow control mechanism that is implemented using input queues for the links providing an input flow of work elements to a component. This flow control mechanism allows data to flow between the components of a dataflow graph without necessarily being written to non-volatile local storage, such as a disk drive, which is typically large but slow. The input queues can be kept small enough to hold work elements in volatile memory, typically smaller and faster than non-volatile memory. This potential savings in storage space and time exists even for very large data sets. Components can use output buffers instead of, or in addition to, input queues. When two components are connected by a flow, the upstream component sends work elements to the downstream component as long as the downstream component keeps consuming the work elements. If the downstream component falls behind, the upstream component will fill up the input queue of the downstream component and stop working until the input queue clears out again.

In some arrangements, the micrograph 160 is executed on a scheduled basis by a scheduling process, as part of a batch dataflow graph, or from the command line, and is not necessarily loaded into a specialized component of a containing dataflow graph. Alternatively, a scheduler can use a specialized component to launch a micrograph for batch processing by sending a message to a queue that provides a continuous flow of messages to a running dataflow graph containing a specialized component that will load the appropriate micrograph in response to the message from the queue.

2. Specialized Component

Figure 3A:
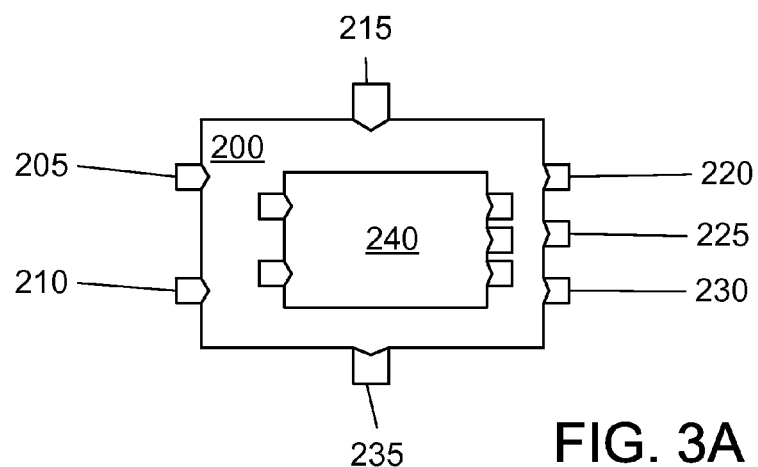
FIG. 3A is an illustration of an exemplary specialized component.

Referring to FIG. 3A, in one embodiment, a specialized component 200 is configured to accept multiple inputs 205, 210, 215 and deliver multiple outputs 220, 225, 230, and 235. The inputs include data inputs 205, 210, and a control input 215. The outputs include data outputs 220, 225, 230, and a status output 235. The control input 215 accepts an identifier of a micrograph 240 to run (e.g., within a received control element), and optionally a set of parameters used to run the micrograph 240. In general, the specialized component 200 may accept zero or more flows of input work elements over respective data input ports, such as data inputs 205, 210. The status output 235 produces a status record which includes exit status and tracking information from the execution of the micrograph 240. Additionally, the specialized component produces zero or more flows of output work elements over respective data output ports, such as data outputs 220, 225, and 230. In one embodiment, the specialized component 200 produces one status record and accepts one control record during a normal execution.

The control input 215 can receive a series of multiple control elements that each identifies a corresponding micrograph to be loaded. Each control input element is associated with a different subset of work elements in the flow(s) of work elements received over the data input(s) that represent a unit of work to be processed by the identified micrograph. In some cases, the control element identifying the micrograph is generated based on analyzing one or more work elements in the unit of work to select the appropriate micrograph to process that unit of work. In some cases, the control element identifying the micrograph and the work elements representing the unit of work to be processed by the identified micrograph are received independently and are matched to each other using any of a variety of techniques. For example, the control element identifying the micrograph is received first and the work elements representing the unit of work to be processed by the identified micrograph are determined by matching a key value appearing in at least one work element of a unit of work to a corresponding control element (e.g., just the first work element in the unit of work, or every work element in the unit of work). Alternatively, work elements called "delimiter work elements" can function as delimiters that separate different sequences of work elements belonging to the same unit of work. Alternatively, the specialized component 200 is configured to receive a predetermined number of work elements to belong to successive units of work to be associated with respective control elements.

The micrograph 240 can be selected from a collection of micrographs that have been designed to be compatible with the specialized component 200. For example, the number of input ports and output ports of the micrograph 240 may match the number of input ports and output ports of the specialized component 200. In this example, the micrograph 240 has two input ports and three output ports, which could be located on two different components of the micrograph 240 that are configured to receive input flows and three different components of the micrograph 240 that are configured to provide output flows. Alternatively, multiple input or output ports of the micrograph 240 could be located on the same component.

In some embodiments, the specialized component 200 monitors the micrograph 240 for predefined conditions and may respond to those conditions. For example, the specialized component 200 may use a separate process to monitor the process that executes the components of the micrograph 240 to determine if the latency during execution of the micrograph 240 exceeds a maximum threshold or for a timeout condition. In response, the specialized component 200 may respond to the condition by, for example, loading a second instance of the micrograph 240. Similarly, error conditions are monitored. In response to detecting an error condition, the specialized component 200 may log the error, redirect the unit of work based on the error condition, and, if necessary, may restart a micrograph 240 and report the error via the status output 235. The restarting of the micrograph 240 does not need to interrupt any other components of the containing dataflow graph in which the specialized component 200 is contained.

In some embodiments, the specialized component 200 analyzes the data flow on an input port to determine which micrograph 240 to execute. In other embodiments, the name or other identifying information of the micrograph 240 to run is supplied to the specialized component 200 as part of the data flow. In still other embodiments, the information identifying the micrograph 240 is supplied through the control input 215 of the specialized component 200.

The specialized component 200 loads the micrograph 240 from the data storage system 107, embeds the micrograph 240 into the dataflow graph containing the specialized component 200, as described in more detail below, and allows the micrograph 240 to process the data flow.

When the operation is complete, the specialized component 200 removes the micrograph 240. In some embodiments, the specialized component 200 may store the micrograph 240 in a micrograph cache stored in a storage location from which it is relatively more easily accessible than from the data storage system 107, for later access. In some embodiments, the specialized component 200 may buffer the incoming data while the micrograph 240 is being loaded, integrated, and removed.

3 Micrograph Structure

Figure 3B:
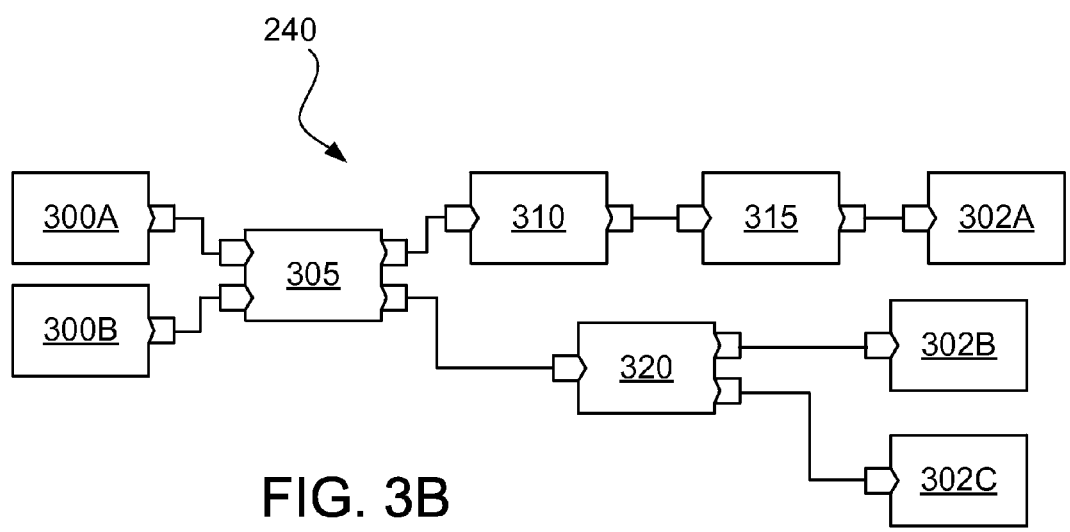
FIG. 3B is an illustration of an exemplary micrograph.

Referring to FIG. 3B, an example of micrograph 240 includes data processing components 305, 310, 315, and 320 which perform operations on input work elements in data flows arriving at one or more input ports linked to upstream components, and produce output work elements in data flows leaving one or more output ports linked to downstream components. The micrograph 240 also includes components 300A, 300B and 302A, 302B, 302C that are configured to facilitate the process of embedding the micrograph 240 into the specialized component 200, called "interface components." Interface components also enable the micrograph to be run as an independent dataflow graph that does not need to be embedded into a specialized component to run.

Interface components are used to connect a micrograph to the ports of the containing specialized component. Embedding a micrograph into a specialized component involves determining how to pair each interface component with the correct port of the specialized component. Input interface components (300A, 300B) have an output port, and output interface components (302A, 302B, 302C) have an input port. When an input interface component is paired with an input port of the specialized component, a dataflow link is generated between that input port and the port to which the output port of the input interface component is linked. Similarly, when an output interface component is paired with an output port of the specialized component, a dataflow link is generated between the port to which the input port of the output interface component is linked and that output port.

The correct pairing of interface components with their respective specialized component input and output ports can be determined as follows. The interface components and the ports of the specialized component can optionally be labeled with identifiers. If there is a match between an identifier assigned to an input/output port of the specialized component and an identifier assigned to an input/output interface component, then that port and that interface component will be paired. Matches between identifiers can be exact, or inexact (e.g., finding a match between some prefix or postfix of an identifier). In one pairing procedure, after exact matches are determined, interface components with numeric suffixes are matched to ports with matching numeric suffixes (e.g., an "out1" port of a specialized component will be paired with a "Micrograph Output-1" interface component).

When a micrograph is executed outside of a specialized component (e.g., in response to a command from the development environment 108 for testing purposes) the interface components provide the functionality of dataset components, providing a source or sink of work elements in a data flow over the link connected to the interface component's output or input port. The appropriate functionality is determined based on whether the micrograph has been embedded within a specialized component. The interface components each include instructions for sending work elements between the micrograph and the specialized component when the micrograph is embedded within a specialized component, and instructions for sending work elements between the micrograph and a storage location when the micrograph is not embedded within a specialized component. The storage location can be a file that is read to provide input work elements or written to receive output work elements.

In some embodiments, the micrograph 240 is configured by placing certain constraints on the functionality of the data processing components that can be included in the micrograph (in this example, components 305, 310, 315, and 320). For example, in some embodiments, the data processing components 305, 310, 315, and 320 of the micrograph 240 may be required to be able to be run within a single process (e.g., by being folded into a single process as described in more detail in U.S. Publication No. 2007/0271381, incorporated herein by reference). In some embodiments, a micrograph does not support subscriber components that receive data from a subscribed source (such as a queue). In some embodiments, a micrograph may be required to be configured as a batch dataflow graph. In some embodiments, any transactional operations executed by the micrograph 240 must fit into a single transaction. In other embodiments, the transactional aspects of the micrograph 240, for example checkpoints, transactional context, and multi-phase commits is controlled through a control input 215.

In dataflow graph processing, the continuous flow of data can affect traditional transactional semantics. A checkpoint operation involves storing sufficient state information at a point in the data flow to enable the dataflow graph to restart from that point in the data flow. If checkpoints are taken too often, performance degrades. If checkpoints are taken too infrequently, recovery procedures in the case of a transactional failure become more complex and resource intensive. A transactional context may be used to inform the micrograph that its operations are part of a larger transaction. This transaction may be a larger transaction encompassing multiple components acting against a single data source, or may include information necessary to coordinate the transaction across multiple data source, for example, in a two phase commit operation.

4 Micrograph Management

Figure 4:
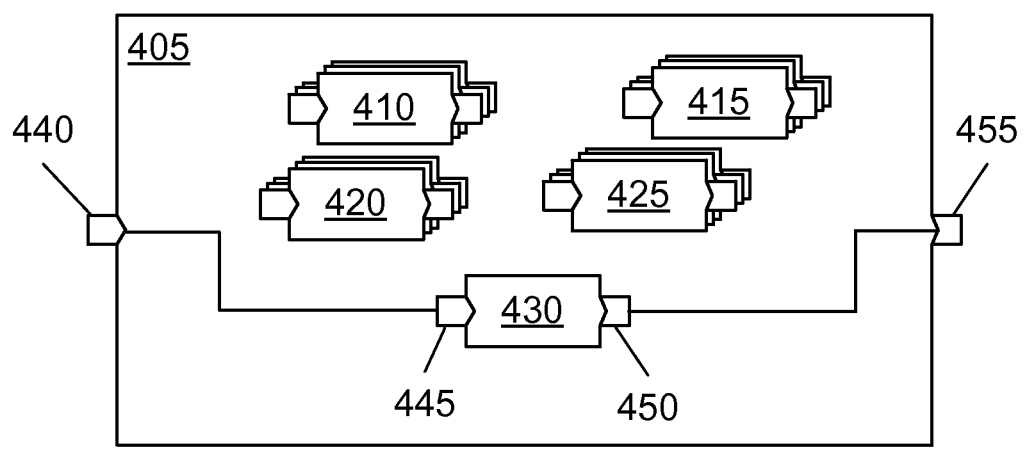
FIG. 4 is an illustration of an exemplary specialized component with a plurality of micrographs in memory.

Referring to FIG. 4, in one embodiment, a specialized component 405 may have more than one micrograph loaded into a cache accessible to the specialized component (e.g., stored in a local memory) at a time. In this example, one micrograph 430 is connected into the dataflow graph that includes the specialized component 405. The input 440 of the specialized component 405 is connected by a link to the input 445 of the micrograph 430 and the output 450 of the micrograph 430 is connected by a link to the output 455 of the specialized component 405. The input 440 and output 450 of the micrograph 430 represent input and output interface components, for example, or any other mechanism for embedding a micrograph into a specialized component.

The cache storing the other micrographs 410, 415, 420, and 425 can be located in the same memory that stores the connected micrograph 430. In some embodiments, the micrographs 410, 415, 420, 425, and 430 are able to execute as threads within the same process that runs the specialized component 405, or as child processes of that process. Alternatively, the micrographs 410, 415, 420, 425, and 430 may be executed within the same main thread of that process. In some embodiments, the specialized component 405 runs multiple copies of the micrographs 410, 415, 420, 425, and 430. In some embodiments, the specialized component 405 uses the copy of a selected micrographs that is stored in the cache before accessing the original micrograph stored in the data storage system 107 unless that copy is marked as "dirty" (indicating that there has been a change in the original micrograph). When a copy of the selected micrograph is not in the cache, the specialized component 405 loads the micrograph from the data storage system 107. In some embodiments, the selected micrograph is indicated (e.g., by an entry in the cache) as being in an "offline" state, indicating that the selected micrograph is currently unavailable (e.g., the micrograph may be in the process of being modified by a developer). In response, the specialized component can indicate an error in loading the selected micrograph, or can load a substitute micrograph (e.g., a different micrograph that has similar capabilities).

Figure 5A:
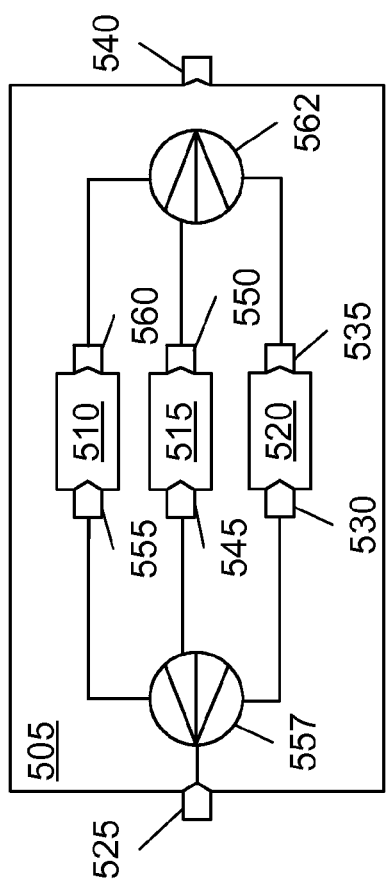
FIG. 5A is an illustration of an exemplary specialized component with multiple micrographs processing data flows.

Referring to FIG. 5A, in one scenario, a single specialized component 505 has multiple micrographs 510, 515, and 520 integrated into the data flow at the same time. The input port 525 of the specialized component 505 is connected to the inputs 530, 545, 555 of the micrographs 520, 515, and 510, respectively, using a partition component 557 that partitions work elements from an input data flow into multiple data flows. The outputs 535, 550, and 560 of the micrographs are connected to the output 540 port of the specialized component 505, using a component 562 (called a "gather component") that gathers work elements from multiple data flows and merges them into a single output data flow. In this configuration, the specialized component 505 is able to route the incoming data to the micrographs 510, 515, and 520. For example, when the components are separate copies of identical micrographs, the specialized component 505 may utilize load balancing algorithms (e.g. round robin, least utilized, etc. . . . ) when performing the partitioning.

Figure 5B:
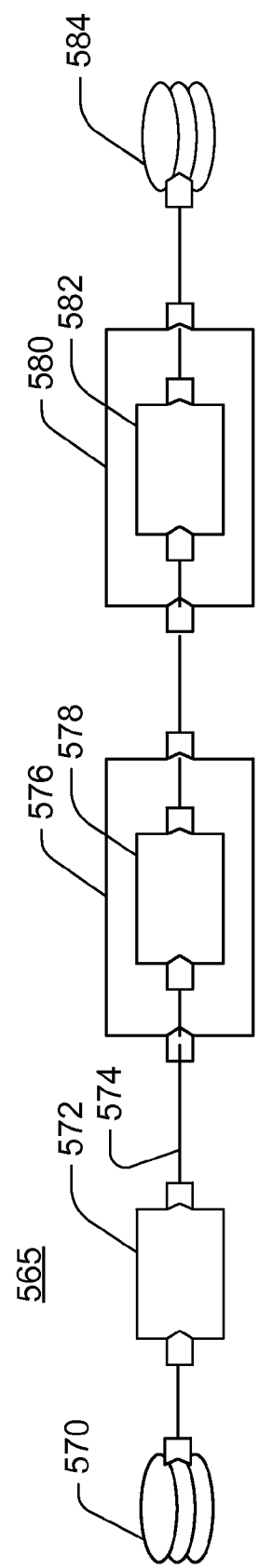
FIG. 5B is an illustration of an exemplary dataflow graph with multiple specialized components.

Referring to FIG. 5B, in another scenario, a dataflow graph 565 includes multiple specialized components, enabling flexible combinations of micrographs to be arranged in a highly customizable container dataflow graph. In this example, work elements from a dataset component 570 (which may represent a batch of input data or a continuous stream of input data) are first processed by a data processing component 572 (e.g., to reformat the work elements) and then sent over a link 574 to the first specialized component 576. In response to detecting a particular type of work element, the component 576 loads a micrograph 578 configured for processing work elements of the detected type. The processed output work elements from the first specialized component 576 are then sent to a second specialized component 580, which loads a micrograph 582. In this arrangement, the micrograph 582 that is selected for loading into the second specialized component 580 can depend on results of the first selected micrograph 578. Resulting output work elements are sent to a dataset component 584. A large number of combinations of different micrographs can be dynamically loaded using specialized components in strategic locations within a dataflow graph. In this simple example, if there are 10 different possible micrographs that can be loaded into the first specialized component 576 and 10 different possible micrographs that can be loaded into the second specialized component 580, there are as many as 100 different dataflow graphs that can be dynamically constructed on demand while a data flow is being processed, with potentially much fewer resources needed compared to partitioning a dataflow to 100 different running dataflow graphs, and with potentially much faster latency compared to starting up one of 100 different dataflow graphs for each unit of work.

5 Pre-Processing and Post-Processing

Figure 6:
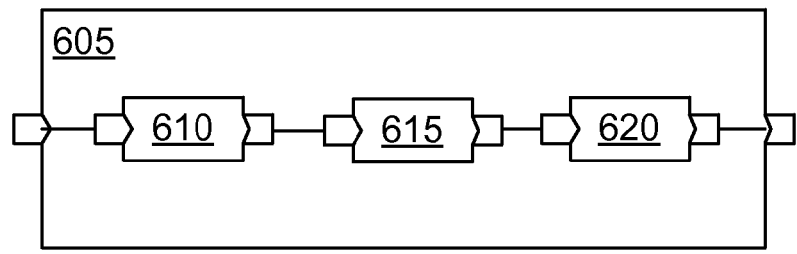
FIG. 6 is block diagram of an exemplary specialized component including pre and post processing components.

A specialized component can include other components in addition to the components within the loaded micrograph. Referring to FIG. 6, in one embodiment, the specialized component 605 includes pre-processing before the micrograph is executed, and post-processing after the micrograph is executed (represented in the figure as pre-processing component 610 and post-processing component 620 surrounding the micrograph 615). Pre and post processing activities may pertain to, for example, transaction management. In some embodiments, each micrograph 615 represents a separate transaction, in which case the pre-processing may start a transaction and the post processing may end the transaction. In other embodiments, the micrograph 615 may represent a checkpoint in a longer transaction. For example, the micrograph 615 may be part of a longer transaction using a two phase commit protocol. Such a transaction may be processed using multiple different micrographs or multiple executions of the same micrograph, for example.

The pre-processing component 610 may load the micrograph 615 from a data store (not shown) and potentially store the loaded micrograph in a data cache for later access or access a loaded version of the micrograph from an in memory cache (not shown) and integrate it into the specialized component 605. The post-processing component 620 may remove a loaded micrograph 615 from its integration with the data flow of the specialized component 605. A variety of other pre and post processing functions can be performed including, for example, pre-processing by preparing records within a data flow for processing by the micrograph 615 (e.g., reformatting the records), and post-processing by preparing records received from the micrograph 615 for processing by components connected to the output of the specialized component 605 (e.g., by reformatting the records).

6 Database Connection Management

Figure 7:
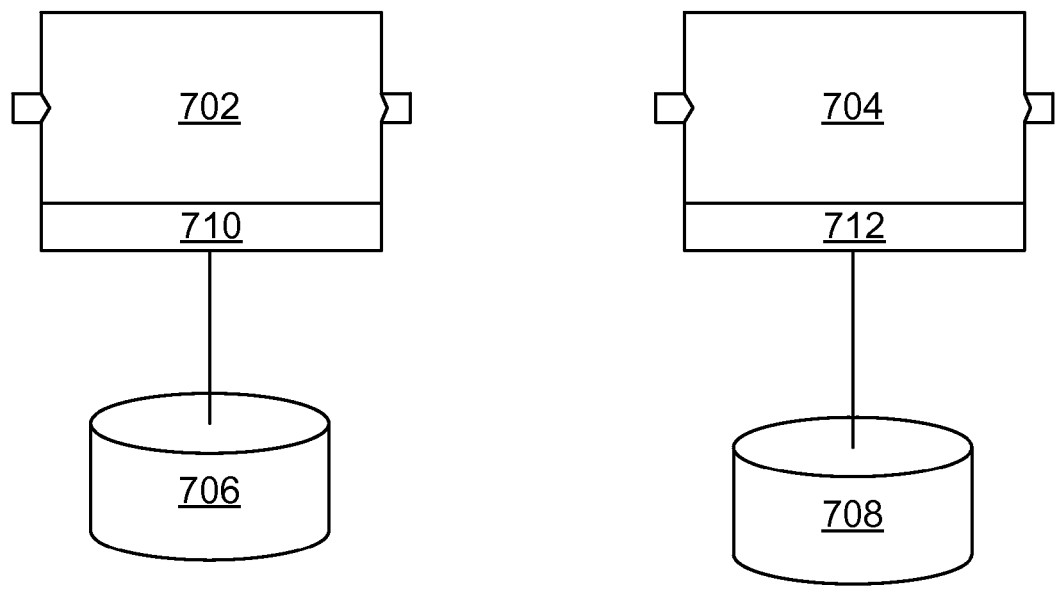
FIG. 7 is an illustration of example of multiple data flow components, each interacting with a single database.

Referring to FIG. 7, in some scenarios, different components are required to be able to access different types of databases. For example, component 702 is required to access a database 706 provided by one vendor, while another component 704 is required to access a database 704 provided by another vendor. Generally, a component 702 will access a database 706 by accessing a library 710 integrated into the component, for example, a library supplied by the vendor of the database 706. Similarly, component 704 will access the database 708 by accessing another library 712 integrated into the component, for example, a library provided by the vendor of database 708. Libraries can be compiled into a particular component, or can be dynamically linked to a particular component.

Figure 8:
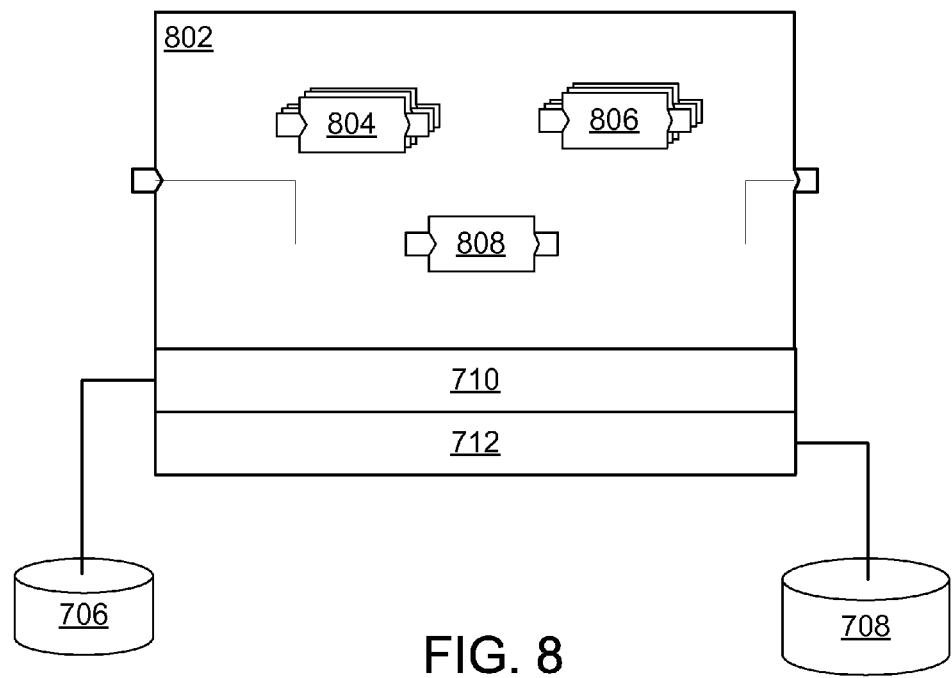
FIG. 8 is an illustration of an exemplary data flow component interacting with multiple databases.

Referring to FIG. 8, a specialized component 802 can include multiple different micrographs 804, 806, and 808. In this example, micrograph 808 is embedded within the specialized component 802, and micrographs 804 and 806 are loaded into an accessible cache to be dynamically embedded as necessary. Some of the micrographs may access one database 706 and other micrographs may access another database 708. Traditionally, accessing the two databases may require a library 710 to support the first database 706 and another library 712 to support the other database 708 to be integrated with the specialized component 802. Integrating multiple different database libraries can lead to an increased size in the binaries associated with the specialized component 802, as well as unpredictable behavior if one library 710 supplied by a vendor is incompatible with another library 712 supplied by the different vendor. For example, incompatibilities may include conflicting symbol names or different compilation models.

Figure 9A:
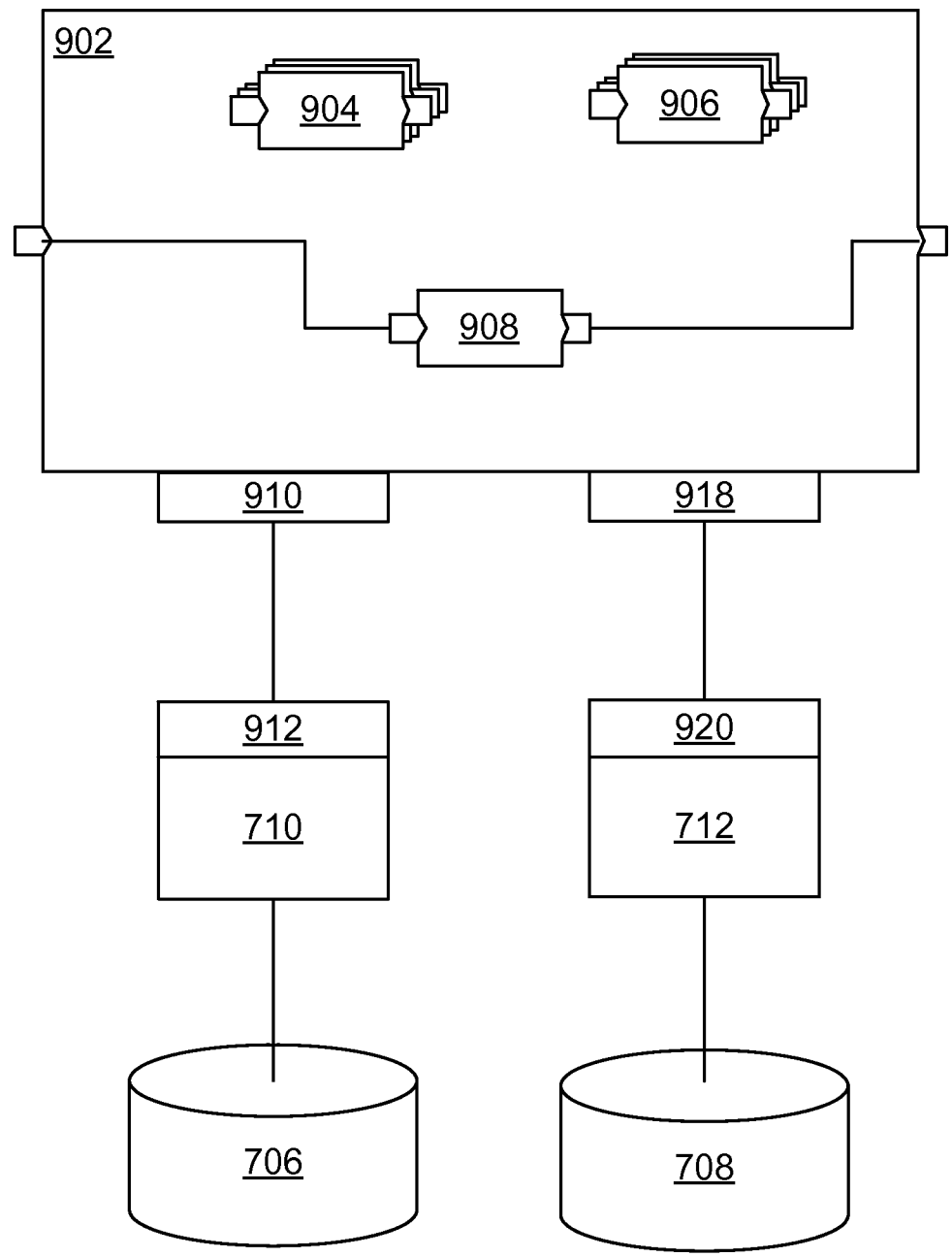
FIG. 9A is an illustration of an exemplary data flow component interacting with multiple databases.

One method of avoiding incompatibilities and/or decreasing the size of the binaries is to remove the libraries from the specialized component and, instead, have them accessed by a separate computer process from a process executing the specialized component. Referring to FIG. 9A, the database libraries 710 and 712 are removed from the specialized component 902 (e.g., not compiled or dynamically liked to the component 902). Micrograph components 904, 906, and 908 access the databases 706, 708 by accessing the libraries 710, 712 over a client/server interface. In order to access the libraries 710, 712, the specialized component 902 uses an integrated client stub 910 which communicates with a paired server stub 912 running in an external process using inter-process communication. For example, the external processes and the specialized component 902 may exchange data by accessing a shared memory segment. Similarly, to access the external process running the server stub 920, the specialized component 902 uses another integrated client stub 918 which communicates with the server stub 920 running in an external process using inter-process communication.

The server stub 912 integrates with the database library 710 in order to provide access to the database 706. Similarly, the server stub 920 integrates with the database library 712 in order to provide access to the database 708. Generally, the client stubs 910, 918 have a smaller memory footprint than the database libraries 710, 712 and therefore allow the specialized component to use less memory resources. Additionally, because the database libraries have been moved out of the specialized component 902, there is no risk of incompatibility between the database libraries 710, 712.

Figure 9B:
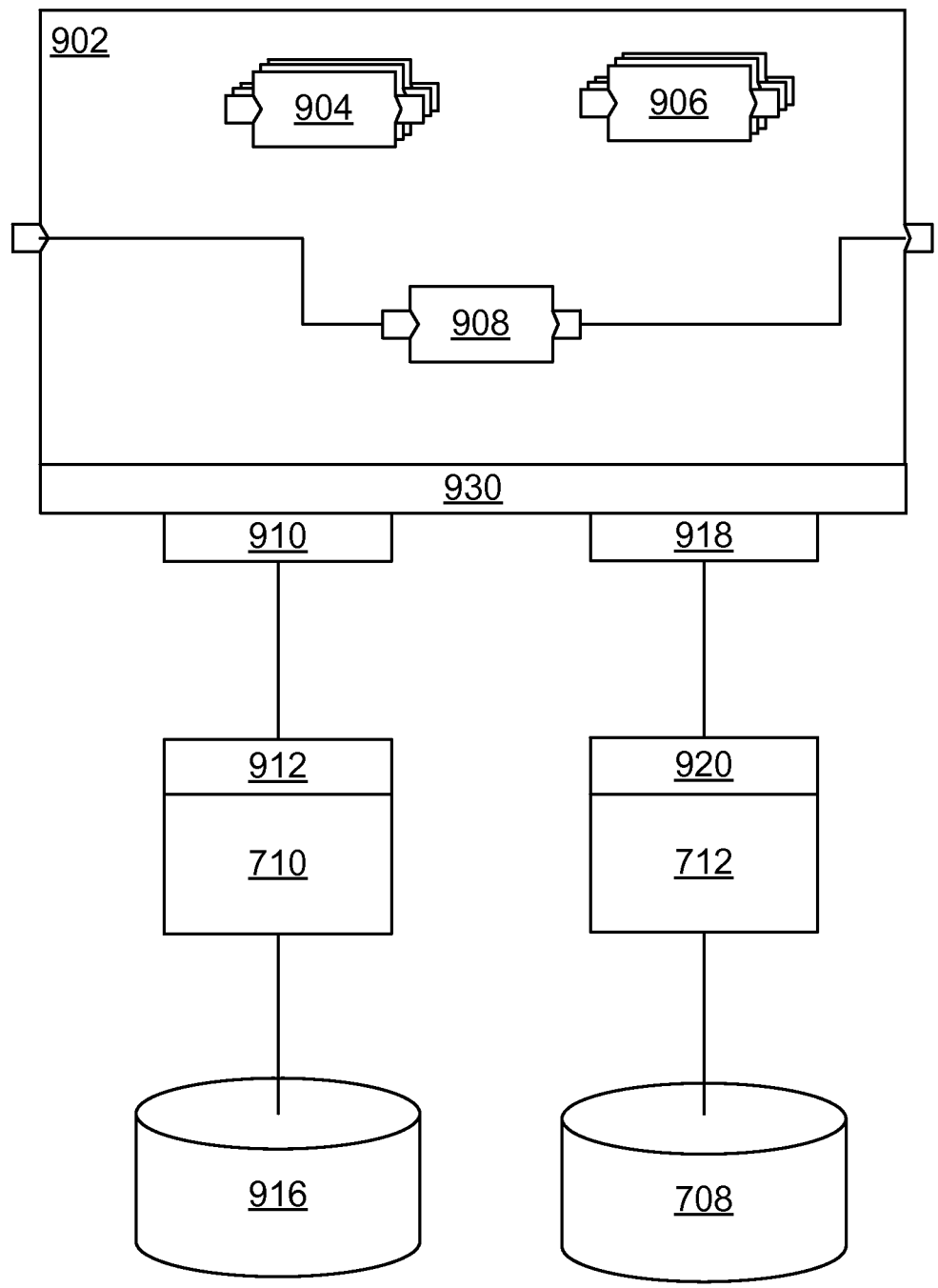
FIG. 9B is an illustration of an exemplary data flow component interacting with multiple databases using a common protocol layer.

Referring to FIG. 9B, in some embodiments, the client stubs 910, 918 and server stubs 912, 920 are configured to closely reflect the respective application programming interfaces (APIs) of the database libraries 710, 712. In order to isolate the micrographs 904, 906, and 908 from differences in library APIs, an abstraction layer 930 is integrated into the specialized component 902. The abstraction layer 930 provides multiple different components within a micrograph that may need to access different databases with a single API with which to perform standard database actions independent of differences between the database libraries for those databases. In some embodiments, the abstraction layer 930 translates the requests from the components of the micrographs into specific calls to the library-specific APIs of the client stubs 910, 918. In some embodiments, the abstraction layer 930 passes requests from the micrograph components as generic calls, and each client stub is configured to perform the translation from generic calls into the library-specific calls to that respective server stub's APIs.

7 Compilation and Parameters

Figure 10:
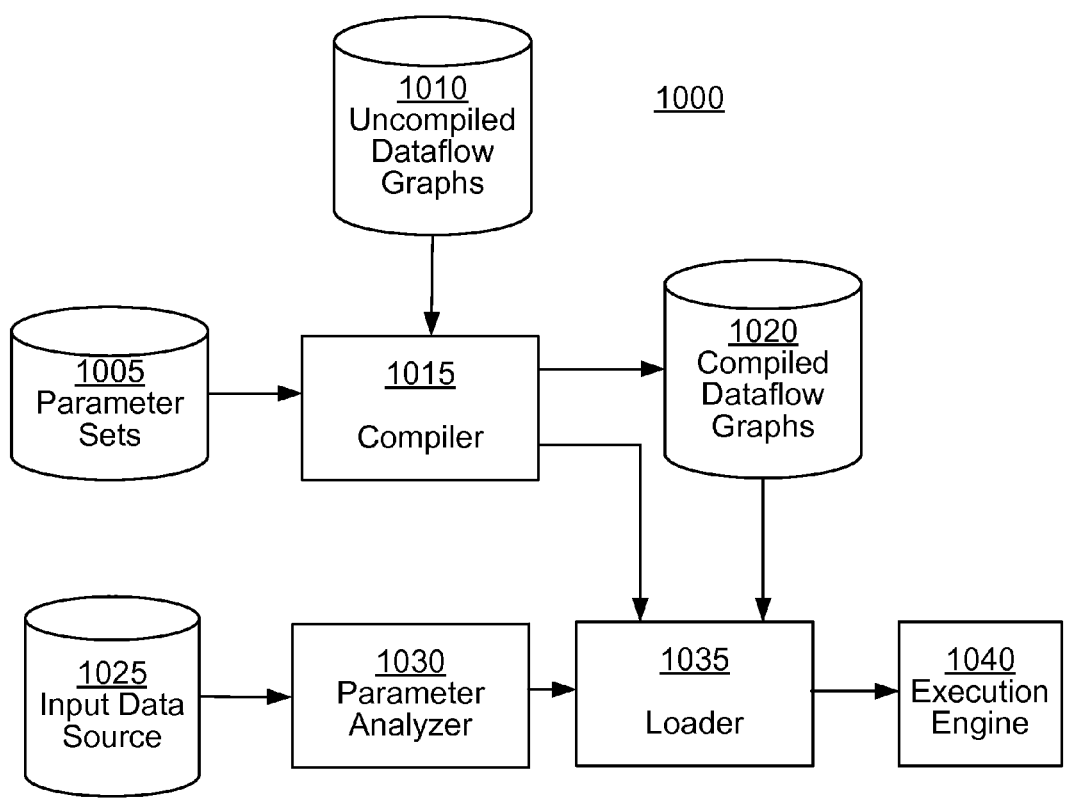
FIG. 10 is a block diagram of an example arrangement of a system in which a dataflow graph is compiled prior to run-time.

Referring to FIG. 10, in one embodiment, a dataflow graph compilation and execution system 1000 includes a dataflow graph compiler 1015, a parameter analyzer 1030, a dataflow graph loader 1035, and a dataflow graph execution engine 1040. The compiler 1015 processes uncompiled dataflow graphs, including micrographs, from an un-compiled dataflow graph data store 1010 based on parameters in parameter sets from a parameter set data store 1005. The value associated with a given parameter can determine any of a variety of characteristics of a dataflow graph. The compiler 1015 compiles the dataflow graphs using values from a parameter set to generate a compiled dataflow graph. The compiled dataflow graph is stored in a compiled dataflow graph data store 1020. The data stores 1010 and 1020 can be hosted, for example, within the data storage system 107. The compiler 1015, parameter analyzer 1030, and loader 1035 can be implemented, for example, as part of the pre-execution module 105. The execution engine 1040 can be implemented as part of the execution module 106.

The parameter set data store 1005 contains sets of parameters and each parameter set can be associated with a dataflow graph. A parameter set includes a group of parameter elements. These elements contain the name of a parameter and an expression that when evaluated (e.g., by performing computations, and in some cases, by finding values of other referenced parameters) are resolved into a value that is bound to the parameter. Each uncompiled dataflow graph can be associated with one or more parameter sets. Some parameters can affect the compilation process. For example, some parameters can affect whether certain conditional components are included in a compiled version of a dataflow graph. Some parameters can affect the loading and launching of a compiled dataflow graph. For example, the value of a parameter can be a path to a file stored on a computer, or the name of a storage location to be associated with a dataset component (e.g., a storage location representing a table in a database) that contains input data or is the target for output data. The value of a parameter can determine how many ways parallel a given component needs to run. The value of a parameter can determine whether a data flow of a link between components crosses a boundary between different processors and/or computers running the linked components, and if so, causing a TCP/IP flow to be allocated rather than a shared memory flow. In some scenarios, the values of the parameters may be dependent upon other parameters. For example, the name of a currency conversion lookup file may be dependent upon a parameter which specifies a date.

In general, a parameter is bound to a value according to rules for parameter scoping based on contexts. A given parameter can have one value in a first context and a different value in another context. A parameter can be bound to a value during compilation (e.g., by the compiler 1015 if the parameter could affect the compilation process), at run-time (e.g., when the loader 1035 loads the compiled dataflow graph data structures into memory for the execution engine 1040), while the dataflow graph is being executed (e.g., delaying a parameter that provides a file name from being resolved until just before the file is read or written), or, in some cases, a combination of different times. The value of a parameter can be defined, for example, by a user over a user interface (e.g., in response to a prompt), defined from a file, included in a data source, or defined in terms of another parameter in the same context or in different context. For example, a parameter can be imported from a different context (e.g., a parameter evaluated in the context of a different component) by designating the parameter to have a "same as" relationship to another parameter.

Parameters for a dataflow graph can be bound before any input data has been received such as during compilation (e.g., by the compiler 1015). Such parameters that are bound before or during compilation of a dataflow graph are called "static parameters." Parameters for a dataflow graph can also be bound in response to receiving new input data such as just before run-time (e.g., by the loader 1035 in response to receiving a new batch of data or an initial unit of work within a flow of data), or during run-time (e.g., by the execution engine 1040 in response to loading a new micrograph to handle a new unit of work within a flow of data). Such parameters that are bound after compilation of the dataflow graph and closer to run-time are called "dynamic parameters." In some cases, dynamic parameters do not need to be re-evaluated for each new batch of data or unit of work within a flow of data. Static parameters are typically evaluated while a graph is being compiled and can affect the compiled dataflow graph. However, static parameters can also be evaluated at run-time if, for example, compilation does not occur until run-time. Because dynamic parameters are evaluated at run-time and may contribute to the overall latency of starting up a dataflow graph, dynamic parameter evaluation can, in some embodiments, be optimized by limiting the capabilities of dynamic parameters. For example, dynamic parameters may be limited to specific data types (e.g. strings), they may not be referenced within certain expressions, and may have more restricted bindings (e.g., not referenced directly or indirectly by a "same as" binding.) However, in other embodiments, dynamic parameters may not be restricted in their functionality and are utilized just like other parameters.

There are various ways to enable the compiler 1015 to distinguish between static and dynamic parameters during the compilation process. One technique uses a flag or special syntax for dynamic parameters in a parameter set, signaling to the compiler that the dynamic parameter should be left unbound. Another technique separates static and dynamic parameters of a parameter set in into different subsets, and only providing the subset of static parameters to the compiler 1015. The subset of dynamic parameters are then provided to the loader 1035 at run-time. Even though the compiler 1015 does not bind the dynamic parameters to resolved values, the compiler 1015 can still be configured to check dynamic parameters (e.g., for illegal syntax or other errors) during compilation. A given expression may include both static and dynamic parameter references. For example, a static directory name parameter can be resolved by the compiler 1015, but a dynamic file name parameter can be left unresolved and the compiler 1015 can preserve the unresolved dynamic parameter reference during the compiling process because it is recognized as a dynamic parameter.

In some scenarios, the existence or value of a parameter may affect the topology and/or connectivity of components within a dataflow graph. A parameter may indicate that the operations performed by one or more components are not to be executed during a particular execution of the graph. This may be especially relevant when the same dataflow graph is used on two different data sources. For example, one data source may be in a first format (e.g., UTF-8) and another source may contain text in a second format that uses different encodings for at least some characters. A dataflow graph that processes both data sources may need to convert text in the second format into the UTF-8 format. However, when accessing a UTF-8 data source, no conversion would be necessary. A parameter could be used to inform the dataflow graph that the data is already in UTF-8 format and that a conversion component may be bypassed. In some arrangements, the exclusion of a conditional component based on a parameter value may result in the conditional component being removed and replaced with a dataflow in the compiled dataflow graph. Additional description of conditional components can be found in U.S. Pat. No. 7,164,422, incorporated herein by reference.

Referring again to FIG. 10, the compiler 1015 obtains an uncompiled dataflow graph from the uncompiled dataflow graph data store 1010. The compiler 1015 obtains the parameter set that is to be used for compiling the dataflow graph from the parameter set data store 1005. In some cases, multiple different parameter sets could be used for a given dataflow graph, and for each parameter set, the graph compiler 1015 is able to compile a corresponding version of the uncompiled dataflow graph. Each compiled version of the dataflow graph may include or exclude some components or other executable statements based on the values of the parameters in the parameter set. The compiled dataflow graph is associated with the bound parameter values from the parameter set that was used to generate the compiled dataflow graph, for example, when the compiled dataflow graph is serialized. The compiled dataflow graph is associated with the parameter values from the associated parameter set using any of a number of different mechanisms (e.g., a lookup table, a foreign key to primary key relationship in a database, etc. . . . ). The compiled dataflow graph data store 1020 can be implemented, for example, using any file system or database capable of read and write operations.

During dataflow graph execution (at "run-time"), data enters the system from an input data source 1025. The input data source 1025 can include a variety of individual data sources, each of which may have unique storage formats and interfaces (for example, database tables, spreadsheet files, flat text files, or a native format used by a mainframe). The individual data sources can be local to the system 1000, for example, being hosted on the same computer system (e.g., a file), or can be remote to the system 1000, for example, being hosted on a remote computer that is accessed over a local or wide area data network.

The parameter analyzer 1030 and loader 1035 enable a dataflow graph to be quickly loaded from a stored compiled dataflow graph, avoiding the potentially lengthy compilation process, while still allowing flexibility at run-time by selecting among different compiled versions of a dataflow graph in response to a received input data. The parameter analyzer 1030, in response to receiving input data from the input data source 1025, analyzes the input data, and potentially other values that may not be known until run-time, to determine values for one or more parameters (potentially including both static parameters and dynamic parameters) to be used with a target dataflow graph. The target dataflow graph is an uncompiled dataflow graph that has been compiled into different versions stored in the compiled dataflow graph data store 1020 using different respective parameter sets. The loader 1035 compares any values of static parameter provided by the parameter analyzer 1030 with any values of those same parameters that may have been used to generate any of the compiled versions of the target dataflow graphs to find a match. If the loader 1035 finds a match in the static parameters, then the loader 1035 can resolve and bind the dynamic parameters, and load the resulting dataflow graph to be launched by the execution engine 1040. If the loader 1035 does not find a match in the static parameters, the loader 1035 can route the input data to an error processor (not shown), or the loader 1035 may have a version of the target dataflow graph available which is capable of handling different possible parameter values as a non-optimized default. Alternatively, the loader can initiate the compiler 1015 to compile a new version of the target dataflow graph with the appropriate static parameter values. In these cases, compilation can be done on the fly as needed. The first time a target dataflow graph is run, compilation is done at run-time and the resulting compiled dataflow graph with bound static parameters is saved. Then the next time the target dataflow graph is run, it is only recompiled if a compiled version with the desired static parameter values is not found.

For example, for a parameter set including parameters A, B, C (with A and B static, and C dynamic), consider a first compiled version of a target dataflow graph that has been compiled using A=True and B=False, and a second compiled version of the same target dataflow graph that has been compiled using A=True and B=True. If the parameter analyzer 1030 determines that a received unit of work is to be processed using the target dataflow graph with A=True, B=True, and C=True, then the second compiled version can be loaded and the dynamic parameter C is bound by the loader 1035. If the parameter analyzer 1030 determines that a received unit of work is to be processed using the target dataflow graph with A=False, B=True, and C=True, then a new version of the target dataflow graph is compiled by the compiler 1015 with A=False, B=True and the dynamic parameter C is bound by the loader 1035. The newly compiled version can also be stored in the compiled dataflow graph data store 1020 for later use.

The loader 1035 loads the selected compiled dataflow graph into a memory accessible to the graph execution engine 1040 to be executed to process the flow of input data from the input data source 1025. In some embodiments, the function of the loader 1035 is performed by a specialized component in a running dataflow graph and the loaded dataflow graph is a micrograph embedded into the specialized component. The loader 1035 may access a previously loaded version of the selected compiled dataflow graph which remains cached in memory (after determining that the appropriate static parameter values were used) without necessarily needing to access the compiled dataflow graph data store 1020. The loaded dataflow graph is then executed by the execution engine 1040. Once the input data has been processed by the target dataflow graph, the dataflow graph may either be unloaded from the system, or may be cached for later access.

In general, compilation of a dataflow graph is the process by which the graph is transformed into an executable format. The executable format can be in a platform specific form (e.g., machine code) or in an intermediate form (e.g., byte code). In some embodiments, the compiler 1015 resolves the static parameters, traverses the dataflow graph, and reduces it to a set of data structures that are prepared to be executed. The transformation from a dataflow graph, which is represented as vertices and links, to machine code may include several steps. One of these steps can include dynamic code generation where the dataflow graph is transformed into a third generation programming language (e.g. C, C#, C++, Java, etc. . . . ). From the third generation language, machine readable code or byte code can be generated using a standard compiler.

In some embodiments, whether a parameter is treated as a static parameter or a dynamic parameter is not determined until compilation. Parameters that are evaluated and their values hard coded into the compiled dataflow graph area treated as static parameters. Whereas, dynamic parameters are generally not evaluated at compile time, but are instead evaluated during graph loading or execution. As described above, the values determined by the parameter set are used for the purposes of preparing different compiled versions of dataflow graphs for fast loading and execution at run-time. In the case where the value of the parameter from the parameter set definitively defines the only possible value that is valid for the compiled graph, the value is coded into the compiled dataflow graph, and the parameter is treated as a static parameter. In other cases, where the value of the parameter from the parameter set provides a range of possible values, the parameter may not be evaluated at compile time as a static parameter, but instead may be evaluated at load-time or run-time as a dynamic parameter.

Also during the compilation process the compiler may optimize the dataflow graph, for example, by eliminating unnecessary executable statements. For example, dataflow graphs may contain conditional components. Conditional components may include a series of executable statement which are either included in or excluded from the compiled dataflow graph based on the value of one of more parameters. Conditional components can be used for a variety of purposes, such as graph optimization or specialization. For graph optimization, an application may omit processing or creation of datasets if values from them will not be used, thus allowing the graph to run more efficiently. For graph specialization, an application might condition the production of several different output datasets based on the level of detail desired, or allow execution of one of several optional portions of a graph.

The approaches described above can be implemented using software for execution on a computer. For instance, the software forms procedures in one or more computer programs that execute on one or more programmed or programmable computer systems (which is of various architectures such as distributed, client/server, or grid) each including at least one processor, at least one data storage system (including volatile and non-volatile, non-transitory memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software is provided on a storage medium, such as a CD-ROM, readable by a general or special purpose programmable computer or delivered (encoded in a propagated signal) over a communication medium of a network to the computer where it is executed. All of the functions are performed on a special purpose computer, or using special-purpose hardware, such as coprocessors. The software is implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications is made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. Other embodiments are within the scope of the following claims.

What is claimed is:

1. A method for processing data in a data processing system using compiled dataflow graphs stored in a data storage system, the method including:
   receiving multiple units of work that each include one or more work elements; and
   processing a unit of work of the multiple units of work, the processing including:
      analyzing the unit of work to determine a characteristic of the unit of work;
      identifying a compiled dataflow graph, from multiple compiled dataflow graphs that were compiled before the unit of work was received, for processing a unit of work having the determined characteristic of the unit of work;
      loading the identified compiled dataflow graph into a data processing program being executed by the data processing system, wherein the data processing program is being executed before receipt of the unit of work; and
      generating one or more output work elements from at least one work element in the unit of work using the identified compiled dataflow graph.

2. The method of claim 1, wherein the loading further includes retrieving data structures and loading the retrieved data structures into the data processing program.

3. The method of claim 2, wherein the identified compiled dataflow graph is based on a first dataflow graph and loading the retrieved data structures includes loading the retrieved data structures into a second dataflow graph by embedding the first dataflow graph within a containing component of the second dataflow graph that is configured to provide a first process to execute data processing components in the first dataflow graph.

4. The method of claim 3, wherein the containing component of the second dataflow graph is further configured to provide a first application programming interface that the first process uses to communicate with a second process that accesses a library for a first remote database.

5. The method of claim 2, wherein the identified compiled dataflow graph is based on a first dataflow graph and loading the retrieved data structures includes loading the retrieved data structures into a second dataflow graph by embedding the first dataflow graph within a containing component of the second dataflow graph, the embedding including:
   connecting a flow of input work elements received from a link connected to an input of the containing component to an input of the first dataflow graph, and
   connecting the generated one or more output work elements to a link connected to an output of the containing component.

6. The method of claim 2, further including, after generating the one or more output work elements, unloading the retrieved data structures.

7. The method of claim 1, further including loading another compiled dataflow graph into the data processing system, the other dataflow graph having been compiled into data structures.

8. The method of claim 1, wherein analyzing the unit of work includes reading an identifier included within a work element of the unit of work.

9. The method of claim 1, wherein analyzing the unit of work includes identifying one of multiple predetermined types characterizing a work element of the unit of work.

10. The method of claim 1, wherein analyzing the unit of work includes identifying a property of content included within a work element of the unit of work.

11. The method of claim 1, wherein analyzing the unit of work includes determining one or more values associated with the unit of work that are designated as values for a set of one or more parameters.

12. A data processing system for processing data using compiled dataflow graphs stored in a data storage system, the system including:
   at least one processor; and
   one or more machine-readable hardware storage devices storing instructions that are executable by the at least one processor to perform operations including:
      receiving multiple units of work that each include one or more work elements; and
      processing a unit of work of the multiple units of work, the processing including:
         analyzing the unit of work to determine a characteristic of the unit of work;
         identifying a compiled dataflow graph from multiple compiled dataflow graphs that were compiled before the unit of work was received, for processing a unit of work having the determined characteristic of the unit of work;
         loading the identified compiled dataflow graph into a data processing program being executed by the data processing system, wherein the data processing program is being executed before receipt of the unit of work; and
         generating one or more output work elements from at least one work element in the unit of work using the identified compiled dataflow graph.

13. The data processing apparatus of claim 12, wherein the loading further includes retrieving data structures and loading the retrieved data structures into the data processing program.

14. The data processing apparatus of claim 13, wherein the identified compiled dataflow graph is based on a first dataflow graph and loading the retrieved data structures includes loading the retrieved data structures into a second dataflow graph by embedding the first dataflow graph within a containing component of the second dataflow graph that is configured to provide a first process to execute data processing components in the first dataflow graph.

15. The data processing apparatus of claim 14, wherein the containing component of the second dataflow graph is further configured to provide a first application programming interface that the first process uses to communicate with a second process that accesses a library for a first remote database.

16. The data processing apparatus of claim 13, wherein the identified compiled dataflow graph is based on a first dataflow graph and loading the retrieved data structures includes loading the retrieved data structures into a second dataflow graph by embedding the first dataflow graph within a containing component of the second dataflow graph, the embedding including:
  connecting a flow of input work elements received from a link connected to an input of the containing component to an input of the first dataflow graph, and
  connecting the generated one or more output work elements to a link connected to an output of the containing component.

17. The data processing apparatus of claim 13, wherein the operations further include after generating the one or more output work elements, unloading the retrieved data structures.

18. The data processing apparatus of claim 12, wherein the operations further include loading another compiled dataflow graph into the data processing system, the other compiled dataflow graph having been compiled into data structures.

19. The data processing apparatus of claim 12, wherein analyzing the unit of work includes reading an identifier included within a work element of the unit of work.

20. The data processing apparatus of claim 12, wherein analyzing the unit of work includes identifying one of multiple predetermined types characterizing a work element of the unit of work.

21. The data processing apparatus of claim 12, wherein analyzing the unit of work includes identifying a property of content included within a work element of the unit of work.

22. The data processing apparatus of claim 12, wherein analyzing the unit of work includes determining one or more values associated with the unit of work that are designated as values for a set of one or more parameters.

23. A data processing system for processing data using compiled dataflow graphs stored in a data storage system, the system including:
  means for receiving multiple units of work that each include one or more work elements; and
  means for processing a unit of work of the multiple units of work, the processing including:
    analyzing the unit of work to determine a characteristic of the first unit of work;
    identifying a compiled dataflow graph from multiple compiled dataflow graphs that were compiled before the unit of work was received, for processing a unit of work having the determined characteristic of the unit of work;
    loading the identified compiled dataflow graph into a data processing program being executed by the data processing system, wherein the data processing program is being executed before receipt of the unit of work; and
    generating one or more output work elements from at least one work element in the unit of work using the identified compiled dataflow graph.

24. A computer-readable medium storing a computer program for processing data in a data processing system using compiled dataflow graphs stored in a data storage system, the computer program including instructions for causing a computer to perform operations comprising:
  receiving multiple units of work that each include one or more work elements; and
  processing a unit of work of the multiple units of work, the processing including:
    analyzing the unit of work to determine a characteristic of the unit of work;
    identifying a compiled dataflow graph from multiple compiled dataflow graphs that were compiled before the unit of work was received, for processing a unit of work having the determined characteristic of the unit of work;
    loading the identified compiled dataflow graph into a data processing program being executed by the data processing system, wherein the data processing program is being executed before receipt of the unit of work; and
    generating one or more output work elements from at least one work element in the unit of work using the identified compiled dataflow graph.

25. The computer-readable medium of claim 24, wherein the loading further includes retrieving data structures and loading the retrieved data structures into the data processing program.

26. The computer-readable medium of claim 25, wherein the identified compiled dataflow graph is based on a first dataflow graph and loading the retrieved data structures includes loading the retrieved data structures into a second dataflow graph by embedding the first dataflow graph within a containing component of the second dataflow graph that is configured to provide a first process to execute data processing components in the first dataflow graph.

27. The computer-readable medium of claim 26, wherein the containing component of the second dataflow graph is further configured to provide a first application programming interface that the first process uses to communicate with a second process that accesses a library for a first remote database.

28. The computer-readable medium of claim 25, wherein the identified compiled dataflow graph is based on a first dataflow graph and loading the retrieved data structures includes loading the retrieved data structures into a second dataflow graph by embedding the first dataflow graph within a containing component of the second dataflow graph, the embedding including:
  connecting a flow of input work elements received from a link connected to an input of the containing component to an input of the first dataflow graph, and
  connecting the generated one or more output work elements to a link connected to an output of the containing component.

29. The computer-readable medium of claim 24, wherein the operations further include after generating the one or more output work elements, unloading the retrieved data structures.

30. The computer-readable medium of claim 24, wherein the operations further include loading another compiled dataflow graph into the data processing system, the other compiled dataflow graph having been compiled into data structures.

31. The computer-readable medium of claim 24, wherein analyzing the unit of work includes reading an identifier included within a work element of the unit of work.

32. The computer-readable medium of claim 24, wherein analyzing the unit of work includes identifying one of multiple predetermined types characterizing a work element of the unit of work.

33. The computer-readable medium of claim 24, wherein analyzing the unit of work includes identifying a property of content included within a work element of the unit of work.

34. The computer-readable medium of claim 24, wherein analyzing the unit of work includes determining one or more values associated with the unit of work that are designated as values for a set of one or more parameters.

35. A method for processing data in a data processing system, the method including:
receiving multiple units of work that each include one or more work elements; and
processing a unit of work of the multiple units of work, the processing including:
analyzing the unit of work to determine a characteristic of the unit of work;
identifying a compiled sub-program from multiple compiled sub-programs that were compiled before the unit of work was received, for processing a unit of work having the determined characteristic of the unit of work;
loading one of the identified compiled sub-program into a data processing program being executed by the data processing system before receipt of the unit of work; and
generating one or more output work elements from at least one work element in the unit of work using the identified compiled sub-program.

36. The method of claim 35, wherein the loading further includes retrieving data structures and loading the retrieved data structures into the data processing program.

37. The method of claim 36, wherein the identified compiled sub-program is a dataflow graph that is based on a first dataflow graph and loading the retrieved data structures includes loading the retrieved data structures into a second dataflow graph by embedding the first dataflow graph within a containing component of the second dataflow graph that is configured to provide a first process to execute data processing components in the first dataflow graph.

38. The method of claim 37, wherein the containing component of the second dataflow graph is further configured to provide a first application programming interface that the first process uses to communicate with a second process that accesses a library for a first remote database.

39. The method of claim 36, wherein the identified compiled sub-program is a dataflow graph that is based on a first dataflow graph and loading the retrieved data structures includes loading the retrieved data structures into a second dataflow graph by embedding the first dataflow graph within a containing component of the second dataflow graph, the embedding including:
connecting a flow of input work elements received from a link connected to an input of the containing component to an input of the first dataflow graph, and
connecting the generated one or more output work elements to a link connected to an output of the containing component.

40. The method of claim 36, further including, after generating the one or more output work elements, unloading the retrieved data structures.

41. The method of claim 35, further including loading another compiled sub-program into the data processing system, the second compiled sub-program having been compiled into data structures.

42. The method of claim 35, wherein analyzing the unit of work includes reading an identifier included within a work element of the unit of work.

43. The method of claim 35, wherein analyzing the unit of work includes identifying one of multiple predetermined types characterizing a work element of the unit of work.

44. The method of claim 35, wherein analyzing the unit of work includes identifying a property of content included within a work element of the unit of work.

45. The method of claim 35, wherein analyzing the unit of work includes determining one or more values associated with the unit of work that are designated as values for a set of one or more parameters.

46. A method for processing data in a data processing system using compiled dataflow graphs stored in a data storage system, the method including:
receiving multiple units of work that each include one or more work elements; and
processing a unit of work of the multiple units of work, the processing including:
analyzing the unit of work to determine a characteristic of the unit of work;
identifying a compiled dataflow graph from multiple compiled dataflow graphs that were compiled before the unit of work was received, for processing a unit of work having the determined characteristic of the unit of work; and
loading the compiled dataflow graph into the data processing system by:
retrieving data structures representing a first dataflow graph from which the compiled dataflow graph is compiled and loading the retrieved data structures into a second dataflow graph by embedding the first dataflow graph within a containing component of the second dataflow graph that is configured to provide a first process to execute the data processing components in the first dataflow graph;
wherein the containing component of the second dataflow graph is further configured to provide a first application programming interface that the first process uses to communicate with a second process that accesses a library for a first remote database; and
generating one or more output work elements from at least one work element in the unit of work using the compiled dataflow graphs.

47. A method for processing data in a data processing system using compiled dataflow graphs stored in a data storage system, the method including:
receiving multiple units of work that each include one or more work elements; and
processing a unit of work of the multiple units of work, the processing including:
analyzing the unit of work to determine a characteristic of the unit of work;
identifying a compiled dataflow graph from multiple compiled dataflow graphs that were compiled before the unit of work was received, for processing a unit of work having the determined characteristic of the unit of work;
loading one of the compiled dataflow graphs into the data processing system by retrieving data structures representing a first dataflow graph from which the compiled dataflow graph is compiled and loading the retrieved data structures into a second dataflow graph by:
embedding the first dataflow graph within a containing component of the second dataflow graph, the embedding including:
connecting a flow of input work elements received from a link connected to an input of the containing component to an input of the first dataflow graph; and
connecting the generated one or more output work elements to a link connected to an output of the containing component; and generating one or more output work elements from at least one work element in the unit of work using the compiled dataflow graph.

48. A computer-readable medium storing a computer program for processing data in a data processing system using compiled sub-programs stored in a data storage system, the computer program including instructions for causing a computer to perform operations comprising:
receiving multiple units of work that each include one or more work elements; and
processing unit of work of the multiple units of work, the processing including:
analyzing the unit of work to determine a characteristic of the unit of work;
identifying a compiled sub-program from multiple compiled sub-programs that were compiled before the unit of work was received, for processing a unit of work having the determined characteristic of the unit of work;
loading one of the identified compiled sub-program into a data processing program being executed by the data processing system before receipt of the unit of work; and
generating one or more output work elements from at least one work element in the unit of work using the identified compiled sub-program.

49. The computer-readable medium of claim 48, wherein the loading further includes retrieving data structures and loading the retrieved data structures into the data processing program.

50. The computer-readable medium of claim 49, wherein the identified compiled sub-program is a dataflow graph that is based on a first dataflow graph and loading the retrieved data structures includes loading the retrieved data structures into a second dataflow graph by embedding the first dataflow graph within a containing component of the second dataflow graph that is configured to provide a first process to execute data processing components in the first dataflow graph.

51. The computer-readable medium of claim 50, wherein the containing component of the second dataflow graph is further configured to provide a first application programming interface that the first process uses to communicate with a second process that accesses a library for a first remote database.

52. The computer-readable medium of claim 49, wherein the identified compiled sub-program is a dataflow graph that is based on a first dataflow graph and loading the retrieved data structures includes loading the retrieved data structures into a second dataflow graph by embedding the first dataflow graph within a containing component of the second dataflow graph, the embedding including:
connecting a flow of input work elements received from a link connected to an input of the containing component to an input of the first dataflow graph, and
connecting the generated one or more output work elements to a link connected to an output of the containing component.

53. The computer-readable medium of claim 49, wherein the operations further include, after generating the one or more output work elements, unloading the retrieved data structures.

54. The computer-readable medium of claim 48, wherein the operations further include loading another compiled sub-program into the data processing system, the second compiled sub-program having been compiled into data structures.

55. The computer-readable medium of claim 48, wherein analyzing the unit of work includes reading an identifier included within a work element of the unit of work.

56. The computer-readable medium of claim 48, wherein analyzing the unit of work includes identifying one of multiple predetermined types characterizing a work element of the unit of work.

57. The computer-readable medium of claim 48, wherein analyzing the unit of work includes identifying a property of content included within a work element of the unit of work.

58. The computer-readable medium of claim 48, wherein analyzing the unit of work includes determining one or more values associated with the unit of work that are designated as values for a set of one or more parameters.

59. A data processing system comprising:
one or more processors; and
a computer-readable medium storing instructions that are executable by the one or more processors perform operations comprising:
receiving multiple units of work that each include one or more work elements; and
processing unit of work of the multiple units of work, the processing including:
analyzing the unit of work to determine a characteristic of the unit of work;
identifying a compiled sub-program from multiple compiled sub-programs that were compiled before the unit of work was received, for processing a unit of work having the determined characteristic of the unit of work;
loading one of the identified compiled sub-program into a data processing program being executed by the data processing system before receipt of the unit of work; and
generating one or more output work elements from at least one work element in the unit of work using the identified compiled sub-program.

60. The data processing system of claim 59, wherein the loading further includes retrieving data structures and loading the retrieved data structures into the data processing program.

61. The data processing system of claim 60, wherein the identified compiled sub-program is a dataflow graph that is based on a first dataflow graph and loading the retrieved data structures includes loading the retrieved data structures into a second dataflow graph by embedding the first dataflow graph within a containing component of the second dataflow graph that is configured to provide a first process to execute data processing components in the first dataflow graph.

62. The data processing system of claim 61, wherein the containing component of the second dataflow graph is further configured to provide a first application programming interface that the first process uses to communicate with a second process that accesses a library for a first remote database.

63. The data processing system of claim 60, wherein the identified compiled sub-program is a dataflow graph that is based on a first dataflow graph and loading the retrieved data structures includes loading the retrieved data structures into a second dataflow graph by embedding the first dataflow graph within a containing component of the second dataflow graph, the embedding including:
connecting a flow of input work elements received from a link connected to an input of the containing component to an input of the first dataflow graph, and connecting the generated one or more output work elements to a link connected to an output of the containing component.

64. The data processing system of claim 60, wherein the operations further include, after generating the one or more output work elements, unloading the retrieved data structures.

65. The data processing system of claim 59, wherein the operations further include loading another compiled sub-program into the data processing system, the second compiled sub-program having been compiled into data structures.

66. The data processing system of claim 59, wherein analyzing the unit of work includes reading an identifier included within a work element of the unit of work.

67. The data processing system of claim 59, wherein analyzing the unit of work includes identifying one of multiple predetermined types characterizing a work element of the unit of work.

68. The data processing system of claim 59, wherein analyzing the unit of work includes identifying a property of content included within a work element of the unit of work.

69. The data processing system of claim 59, wherein analyzing the unit of work includes determining one or more values associated with the unit of work that are designated as values for a set of one or more parameters.

* * * * *

UNITED STATES PATENT AND TRADEMARK OFFICE
CERTIFICATE OF CORRECTION

PATENT NO. : 9,753,751 B2  
APPLICATION NO. : 14/520588  
DATED : September 5, 2017  
INVENTOR(S) : Matthew Darcy Atterbury et al.

Page 1 of 1

It is certified that error appears in the above-identified patent and that said Letters Patent is hereby corrected as shown below:

On the Title Page

Item (72) "Inventors", after "Wholey" insert --III--, therefor.

Item (56) "Other Publications", Column 2, Line 2 delete "Paralex"" and insert --Parallax"--, therefor.

Signed and Sealed this
Twentieth Day of August, 2019

Andrei Iancu
*Director of the United States Patent and Trademark Office*